(12) United States Patent
Hazelton et al.

(10) Patent No.: US 10,474,702 B1
(45) Date of Patent: Nov. 12, 2019

(54) COMPUTER-IMPLEMENTED APPARATUS AND METHOD FOR PROVIDING INFORMATION CONCERNING A FINANCIAL INSTRUMENT

(71) Applicant: Street Diligence, Inc., New York, NY (US)

(72) Inventors: Stephen G. Hazelton, Chappaqua, NY (US); Jarvis Sill, New York, NY (US); Derek Petillo, Brooklyn, NY (US)

(73) Assignee: Street Diligence, Inc., New York, NY (US)

( * ) Notice: Subject to any disclaimer, the term of this patent is extended or adjusted under 35 U.S.C. 154(b) by 85 days.

(21) Appl. No.: 15/827,444

(22) Filed: Nov. 30, 2017

Related U.S. Application Data

(63) Continuation-in-part of application No. 14/829,062, filed on Aug. 18, 2015, now abandoned.
(Continued)

(51) Int. Cl.
| | |
|---|---|
| *G06F 17/30* | (2006.01) |
| *G06F 16/332* | (2019.01) |
| *G06Q 40/06* | (2012.01) |
| *G06F 17/27* | (2006.01) |
| *G06F 16/34* | (2019.01) |
| *G06F 16/93* | (2019.01) |

(52) U.S. Cl.
CPC .......... *G06F 16/3323* (2019.01); *G06F 16/34* (2019.01); *G06F 16/93* (2019.01); *G06F 17/2705* (2013.01); *G06Q 40/06* (2013.01)

(58) Field of Classification Search
CPC .................................................. G06F 16/00
See application file for complete search history.

(56) References Cited

U.S. PATENT DOCUMENTS

| | | |
|---|---|---|
| 5,802,511 A | 9/1998 | Kouchi et al. |
| 6,112,201 A | 8/2000 | Wical |
| | (Continued) | |

FOREIGN PATENT DOCUMENTS

| | | |
|---|---|---|
| CA | 2 381 460 A1 | 2/2001 |
| CA | 2 244 127 C | 4/2002 |
| | (Continued) | |

OTHER PUBLICATIONS

United States Government Accountability Office, Report to the Chairman, United States Securities and Exchange Commission; Financial Audit; Securities and Exchange Commission's Financial Statements for Fiscal Years 2007 and 2006; Nov. 2007, 64 pages.
(Continued)

*Primary Examiner* — Khanh B Pham
(74) *Attorney, Agent, or Firm* — Sunstein Kann Murphy & Timbers LLP

(57) ABSTRACT

Various embodiments provide, to a user, a representation of a debt capital structure of an enterprise that graphically identifies corporate relationships of companies within the enterprise, financial instruments issued by a company within the enterprise, and for a user-selected financial instrument, of a set of companies that are guarantors of financial obligations associated with the user-selected financial instrument, or for a user-selected company, a set of financial instruments the financial obligations of which are guaranteed by the user-selected company.

4 Claims, 35 Drawing Sheets

(29 of 35 Drawing Sheet(s) Filed in Color)

Related U.S. Application Data

(60) Provisional application No. 62/038,573, filed on Aug. 18, 2014, provisional application No. 62/559,872, filed on Sep. 18, 2017.

(56) References Cited

U.S. PATENT DOCUMENTS

| | | | |
|---|---|---|---|
| 6,122,635 | A | 9/2000 | Burakoff et al. |
| 6,665,681 | B1 | 12/2003 | Vogel |
| 6,778,994 | B2 | 8/2004 | Gogolak |
| 6,856,988 | B1 | 2/2005 | Humphrey et al. |
| 7,089,229 | B2 | 8/2006 | Goldman et al. |
| 7,231,590 | B2 | 6/2007 | Abbar et al. |
| 7,324,936 | B2 | 1/2008 | Saldanha et al. |
| 7,480,630 | B2 | 1/2009 | Wallacher |
| 7,657,478 | B2 | 2/2010 | De Diego Arozamena et al. |
| 7,668,865 | B2 | 2/2010 | McDonald |
| 7,761,373 | B2 | 7/2010 | Metz |
| 7,792,814 | B2 | 9/2010 | Cohen |
| 7,801,808 | B1 * | 9/2010 | Mattison ............... G06Q 10/10 705/26.8 |
| 7,870,046 | B2 | 1/2011 | Gupta |
| 8,112,340 | B2 | 2/2012 | Watson et al. |
| 8,180,713 | B1 | 5/2012 | Rigby et al. |
| 8,355,968 | B2 | 1/2013 | Goldman |
| 8,600,916 | B2 | 12/2013 | Chen et al. |
| 8,674,993 | B1 * | 3/2014 | Fleming ............... G06Q 40/06 345/440 |
| 8,954,434 | B2 | 2/2015 | Ahn et al. |
| 2002/0116304 | A1 * | 8/2002 | Casper ............... G06Q 10/063 705/35 |
| 2006/0195375 | A1 | 8/2006 | Bohn |
| 2014/0214825 | A1 | 7/2014 | Zhang et al. |
| 2015/0154413 | A1 | 6/2015 | Digirolamo et al. |

FOREIGN PATENT DOCUMENTS

| | | |
|---|---|---|
| CA | 2 248 793 C | 4/2002 |
| CA | 2 256 408 C | 10/2004 |
| CA | 2 410 881 C | 1/2007 |
| CA | 2 841 865 A1 | 1/2013 |
| CA | 2 546 514 C | 4/2013 |
| WO | WO 2007/127579 A2 | 11/2007 |
| WO | WO 2008/057474 A3 | 5/2008 |
| WO | WO 2012/115965 A1 | 8/2012 |
| WO | WO 2012/148950 A3 | 11/2012 |

OTHER PUBLICATIONS

U.S. Patent and Trademark Office, Non-Final Office Action, U.S. Appl. No. 14/829,062, dated Aug. 30, 2017, 19 pages.

\* cited by examiner

COMPUTER-IMPLEMENTED APPARATUS AND METHOD FOR PROVIDING INFORMATION CONCERNING A FINANCIAL INSTRUMENT

RELATED APPLICATIONS

This patent application is a continuation-in-part of U.S. patent application Ser. No. 14/829,062, titled "Computer-Implemented Apparatus and Method for Providing Information Concerning a Financial Instrument," filed Aug. 18, 2015 and naming Stephen G. Hazelton and Duo Ai as inventors [practitioner's file 4068/1002], which application claims priority from U.S. provisional patent application Ser. No. 62/038,573, titled "Computer-Implemented Apparatus and Method for Providing Information Concerning a Financial Instrument," filed Aug. 18, 2014 and naming Steven G. Hazelton and Duo Ai as inventors [practitioner's file 4068/1001]. This patent application also claims the benefit of U.S. provisional patent application Ser. No. 62/559,872, titled "Computer-Implemented Apparatus and Method for Providing Information Concerning a Financial Instrument," filed Sep. 18, 2017 naming Stephen G. Hazelton, Jarvis Sill, and Derek Petillo as inventors [practitioner's file 4068/1003]. The disclosures of these applications are hereby incorporated herein, in their entirety, by reference.

TECHNICAL FIELD

The present disclosure relates to financial instruments, and more particularly to providing information about financial instruments.

BACKGROUND ART

It is known in the prior art to provide a system and method for locating and displaying a document containing a number or figure selected by the user. Further, it is common in the financial services industry to verify the validity and source of financial numbers in a way and manner such that the user may "click-through" a financial number on a web-based system and view the source document. It is of critical importance for users to verify the integrity of financial data in this manner. The ability to "click-through" to source a document as known in the art provides the user with a verifiable assurance that the number is accurate and current.

SUMMARY OF THE EMBODIMENTS

In accordance with one embodiment. a computer-implemented method of graphically and interactively displaying a debt capital structure of an enterprise, wherein the method utilizes computer processes, includes receiving and storing, at a server, a set of electronic documents pertinent to the debt capital structure of the enterprise. The method parses the set of documents to extract information identifying information used in creating a displayed hierarchy, including a set of financial instruments, each instrument in the set issued by a company within the enterprise. For each financial instrument in the set of financial instruments, the method extracts the issuer thereof, and each company in the enterprise serving as guarantor of obligations created thereby. The method also extracts parent-subsidiary relationships of companies within the enterprise.

Using that information the method causes display of a hierarchy of companies in the enterprise, in which each company in the displayed hierarchy has a graphical representation graphically connected by a line to at least one other company in the displayed hierarchy, so as to indicate a parent-subsidiary relationship.

In the displayed hierarchy, the method shows graphically an issuing set of companies in the enterprise that have issued financial instruments, in a manner that visually associates with each company's graphical representation, in the issuing set, a representation of at least one corresponding financial instrument.

The method then causes an interactive and graphical display, for a user-selected financial instrument, of a set of companies, in the displayed hierarchy, that are guarantors of financial obligations associated with the user-selected financial instrument.

Some embodiments also include receiving, from a user, a graphical input, specifying the user-selected financial instrument that includes graphical selection of the instrument in the display. A graphical input that includes graphical selection of the instrument in the display may be, for example, a mouse click on a displayed instrument's graphical representation.

In another embodiment, rather than cause an interactive and graphical display, for a user-selected financial instrument, of a set of companies, in the displayed hierarchy, that are guarantors of financial obligations associated with the user-selected financial instrument, the method causes an interactive and graphical display, for a user-selected company, a set of financial instruments, in the displayed hierarchy, the financial obligations of which financial instruments are guaranteed by the user-selected company.

Some such embodiments also include receiving, from a user, a graphical input, specifying the user-selected company that includes graphical selection of the company in the display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which:

FIG. 4E schematically illustrates an alternate embodiment of a user interface that allows a user to select a financial instrument to be analyzed against a group of financial instruments;

FIG. 14D schematically illustrates data in tabular form listing guarantors for certain instruments;

DETAILED DESCRIPTION OF SPECIFIC EMBODIMENTS

Figure 1A:
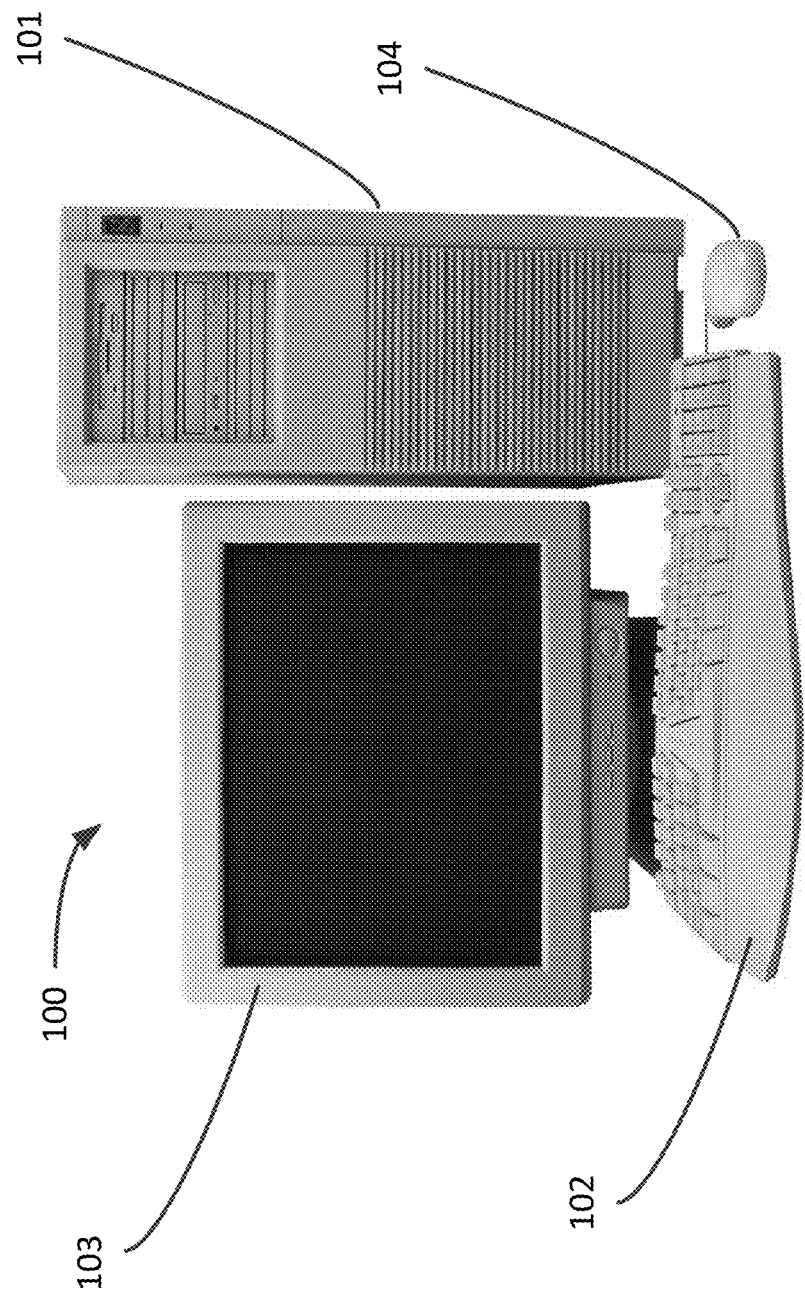
FIG. 1A a schematically illustrates an embodiment of a computer on which some or all of an analytic system may be implemented.

Various embodiments provide to an analyst a variety of analytic information using Business labels that present the information in a way that is intuitive and useful, and which is much more than a singular financial figure based on fact. The Business label represents a collection of terms, conditions and related business and legal concepts described by a string of text that by their collective nature are relevant to investors in financial instruments. For example, a given financial instrument may be analyzed against a relevant population of other financial instruments.

In addition to providing the user with verifiable assurance that business and legal concept is present in the financial instrument, some embodiments have a "click-through" functionality that provides the user with full view of the string of text, which provides context, additional detail and relevant terms and conditions not otherwise known or considered. Additionally, the Business label concept normalizes complex strings of text, allowing the user to compare and contrast business concepts across financial instruments, which is not otherwise possible with an automated system.

The Business label concept also provides relevant analytical and statistical information on business and legal concepts across source documents in the same general class of financial instrument.

Definitions. As used in this description and the accompanying claims, the following terms shall have the meanings indicated, unless the context otherwise requires:

"analytical information" is information, pertaining to at least one issuer or financial instrument, that has been derived from one or more source documents, and that is statistical or benchmark information or litigation precedent.

"auditability" means the automatic hyperlinking of the Business label describing any Analytical Information, data and other information to a Source Document, for the purposes of displaying and describing such information in its original context.

A "Business label" for a given financial instrument is a descriptive name used to identify at least one string of text, typically occurring in a document relating to a financial instrument in the same general class as the given financial instrument, wherein the string pertains to a specific business or legal concept pertinent to the class of financial instrument. A Business label is distinct from a heading, alone or in a table of contents, in that a Business label relates to at least one string of text that need not be in a defined section of the document, nor does the at least one string need to occupy an entire unit of text (such as a paragraph or chapter). Furthermore, sometimes the document relating to the given financial instrument may lack a string pertaining to the specific business or legal concept to which a given Business label relates.

The term "capital structure" means data describing information related to securities issued by an Issuer.

The term "corporate tree" means data that describes the ownership and hierarchy of and between affiliate entities of a company.

The term "text" means a connected piece of written information that includes at least one category selected from the group of categories consisting of words, numbers, graphs, visualizations, and images.

A "flag" or "flagging" means to identify data by form of an icon, highlight or other similar offset.

An "issuer" is a legal entity that has issued a financial instrument.

The term "original document" means any source document that is the first document issued by an issuer to describe a specific security.

A "financial instrument" is a security or other economic interest in a business entity or transaction.

A "modification" is a change to the content of a document made by a supplemental document.

A "set" includes at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "source document" is a document evidencing a financial instrument or other document pertaining to a financial instrument or to an issuer of a financial instrument, including a report, offering memorandum, contract, agreement, notice, financial statement, legal opinion, or letter.

A "supplemental document" means any source document that is an addition, amendment, addendum, deletion, replacement, modification, update, revision or similar change to an original document.

An "enterprise" is a set of business entities in an ownership hierarchy having an ultimate parent company and subsidiary companies, in which each subsidiary is at least 50% owned by an immediate parent company.

The term "corporate structure" has the same meaning as "corporate tree."

The term "structural subordination" means the effect of an instrument issued by a certain entity being subordinate in right of payment to another instrument issued by another entity in the same corporate tree due to the ownership hierarchy and relationship of the two entities.

The term "guarantor" means a legal entity that assumes the guarantee of payment of an instrument's payment obligations in the event the issuer does not make payment.

The term "guarantee" means the act of contractually agreeing to the assumption of payment obligations of an instrument issued by another legal entity or "person."

The term "legal entity" means an entity incorporated in a particular jurisdiction. A "legal entity" may be a corporation, limited liability company, or limited liability partnership, to name but a few examples. A "legal entity" may also be referred to as a "business entity" or "company."

The term "subsidiary" means a legal entity of which a majority of its ownership interests are owned by another legal entity.

The term "parent" means a legal entity that owns majority ownership interest in another entity.

The term "ultimate parent" means a legal entity that is the senior-most parent within a corporate tree.

The term "direct parent" means a legal entity that owns majority interest in a subsidiary.

The term "indirect parent" means a legal entity that is owns majority interest in a subsidiary through an intermediary subsidiary, for which it also owns majority interest.

Illustrative embodiments may be implemented at least in part on a computer, such as computer 100 shown in FIG. 1A. The computer 100 includes a central processing unit ("CPU") 101, a keyboard 102, and a monitor or image display device ("screen") 103. The CPU 101 may include both dynamic memory and static memory, such as a hard disk drive, for example. The CPU also includes a microprocessor in communication with the memory and/or disk drive, and is configured to execute instructions stored in the memory and/or disk drive. To that end, the memory, the disk drive, or both, may be configured to be non-transient and to store executable computer instructions indefinitely. The instructions, when executed by the microprocessor, may implement some or all of the operations and actions described herein. The computer 100 also includes a conventional mouse 104.

Figure 1B:
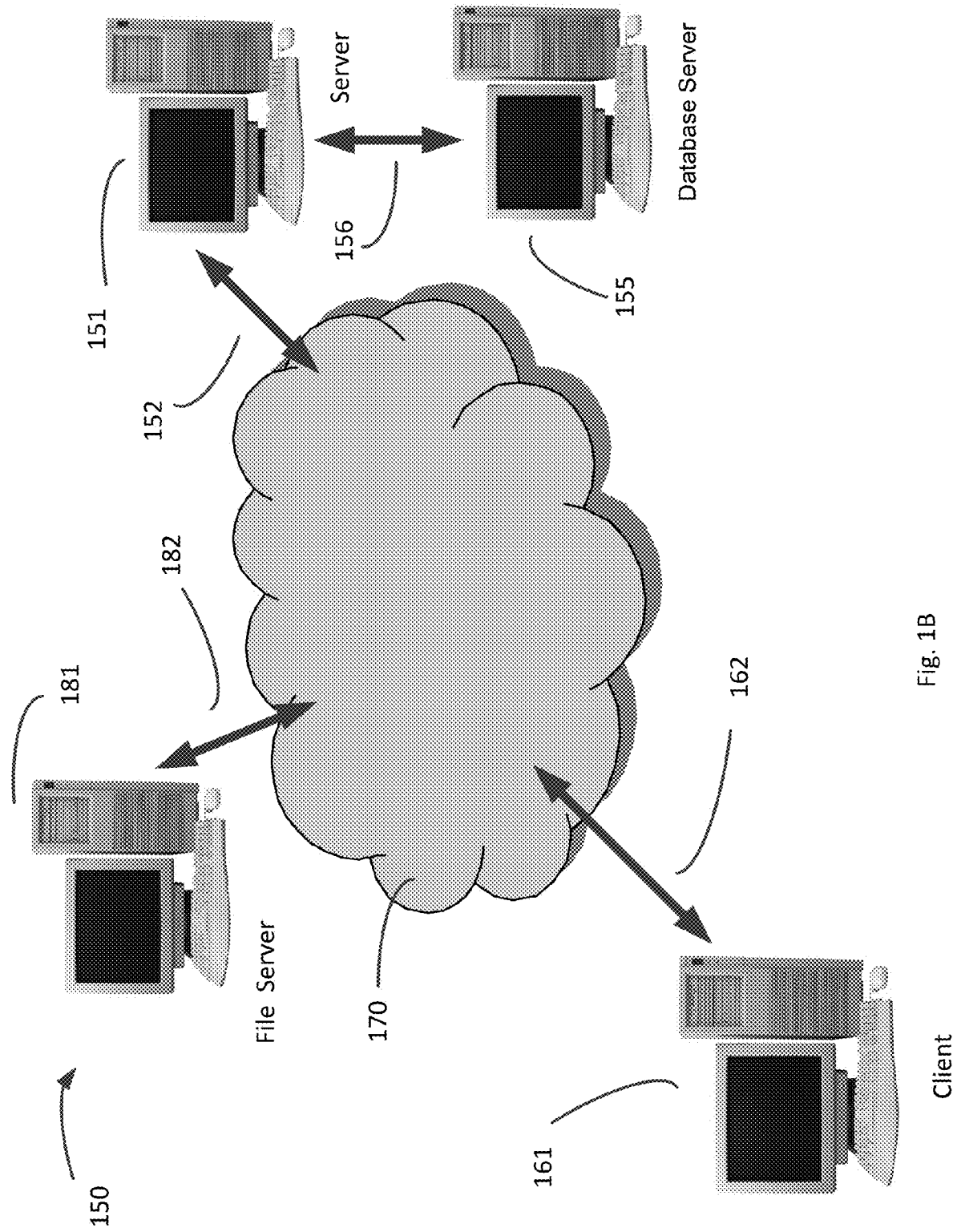
FIG. 1B a schematically illustrates an embodiment of a network of computers by which some or all of an analytic system may be implemented.

The CPU may also include a communications interface, such as a modem or Ethernet port, configured to send emails, SMS messages, or to communicate with other systems, directly or via a network, to execute the operations and actions described herein. Such a system 150 is schematically illustrated in FIG. 1B, for example, in which the system is implemented at least in part on a server computer 151, a database server 155, and a file server 181, while a user interfaces with the system from a remote terminal (e.g., a "client") 161 over a communications link 170.

Any of the computers 151, 155, 161, 181, may be a computer such as computer 100, for example. The communications link 170 may be a local area network, or the Internet, to name two examples. The server 151, remote terminal 161, and file server 181 may each communicate to and through the communications link 170 by establishing a communications connection (152, 162, and 182, respectively) with the communication link 170 via their respective communications interfaces. The server 151 may also communicate with a database server 155 via a communications link 156.

Figure 2A:
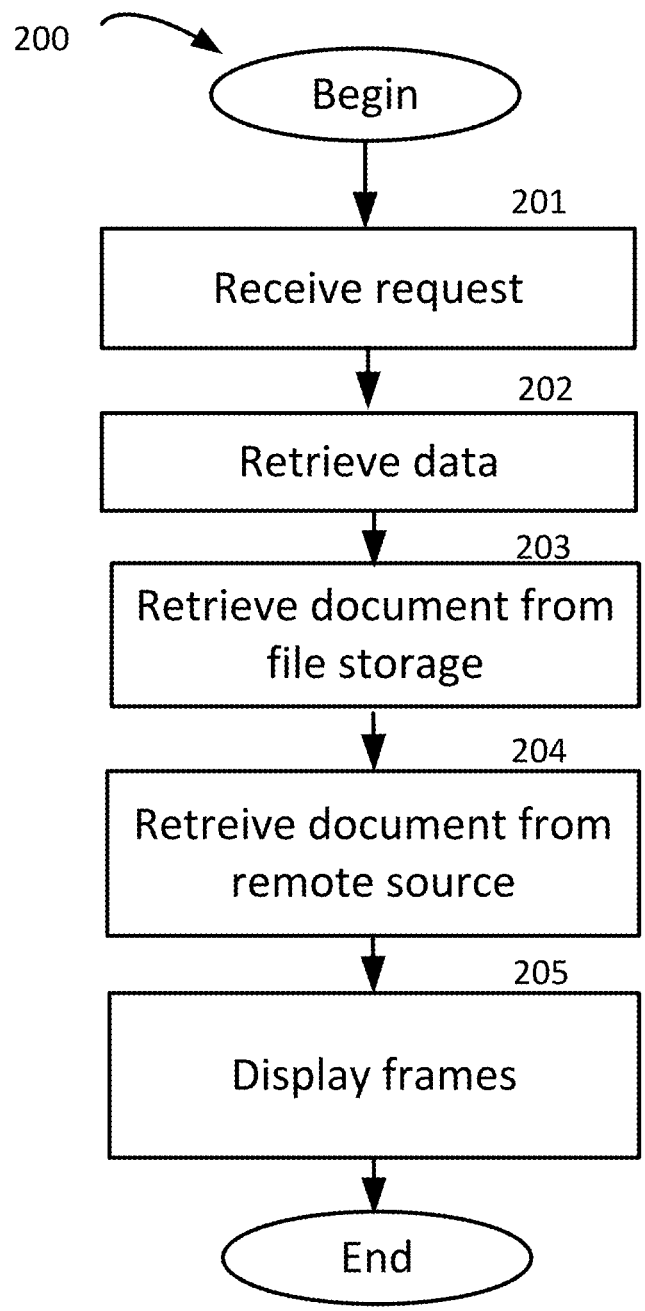
FIG. 2A schematically illustrates a flow chart for implementing various features of a method of analyzing instruments and communicating results of such analysis to a user.
Figure 3:
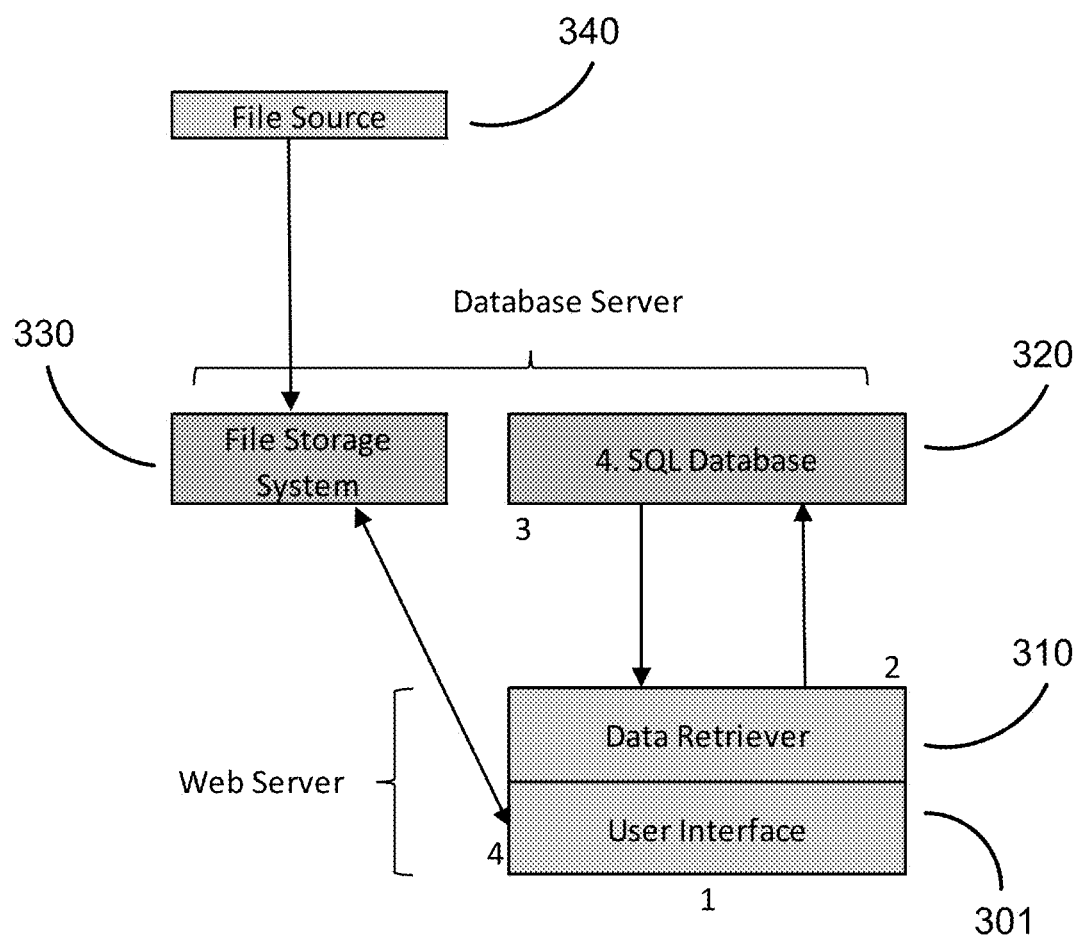
FIG. 3 schematically illustrates an embodiment of modules of a system.

FIG. 2A schematically illustrates a flow chart describing an embodiment of a method 200 enhancing information presentation and analysis. FIG. 3 schematically illustrates a logical organization of data and data flow corresponding to an embodiment of steps of such a method.

In some embodiments, there is a database (e.g., database 320) which stores Business labels as well as analytical and statistical information pertinent to financial instruments. A file system stores the source documents that pertain to the particular financial instruments, which have been collected from various sources. A user interface (e.g., user interface 460) allows users to query the data, and a data retriever collects and processes data when queried. The user of the interface queries the system through the selection of a Business label of a particular financial instrument on the user interface. On receipt of a query by the user, the user interface relays the query to the data retriever, which in turn, requests the relevant Business labels, analytics and statistical information from the database as well as the corresponding source document(s) from the file system. The data retriever relays the data to the user interface and the results of the query are then visible to the user.

At step 201, a server (e.g., server 151) receives a request from a user for information pertaining to a document. The user may generate the request, for example, via a user interface displayed on client computer 161 by a user interface module 301.

At step 202, a data retriever module 310, which may be part of server 151, retrieves from a database 320, which may be stored on server 151 or at database server 155, for example, data relating to and responsive to the user's request. The database 320 may be, for example, a SQL database implement on a SQL product available from Microsoft Corporation.

A database 320, for example at database server 155, includes records storing information about two or more reference documents (e.g., financial instruments) available to facilitate analysis of another document. As is known in the art, a database includes an operational interface, as well as records of data organized in a structure that allows the operational interface to add and edit data, and to retrieve data, or entire records, by searching on data stored in the database. The operational interface may display a user interface on a computer screen, for example to allow a user to manually interact with the database, or may receive and send data in response to communications from other computers.

Figure 4A:
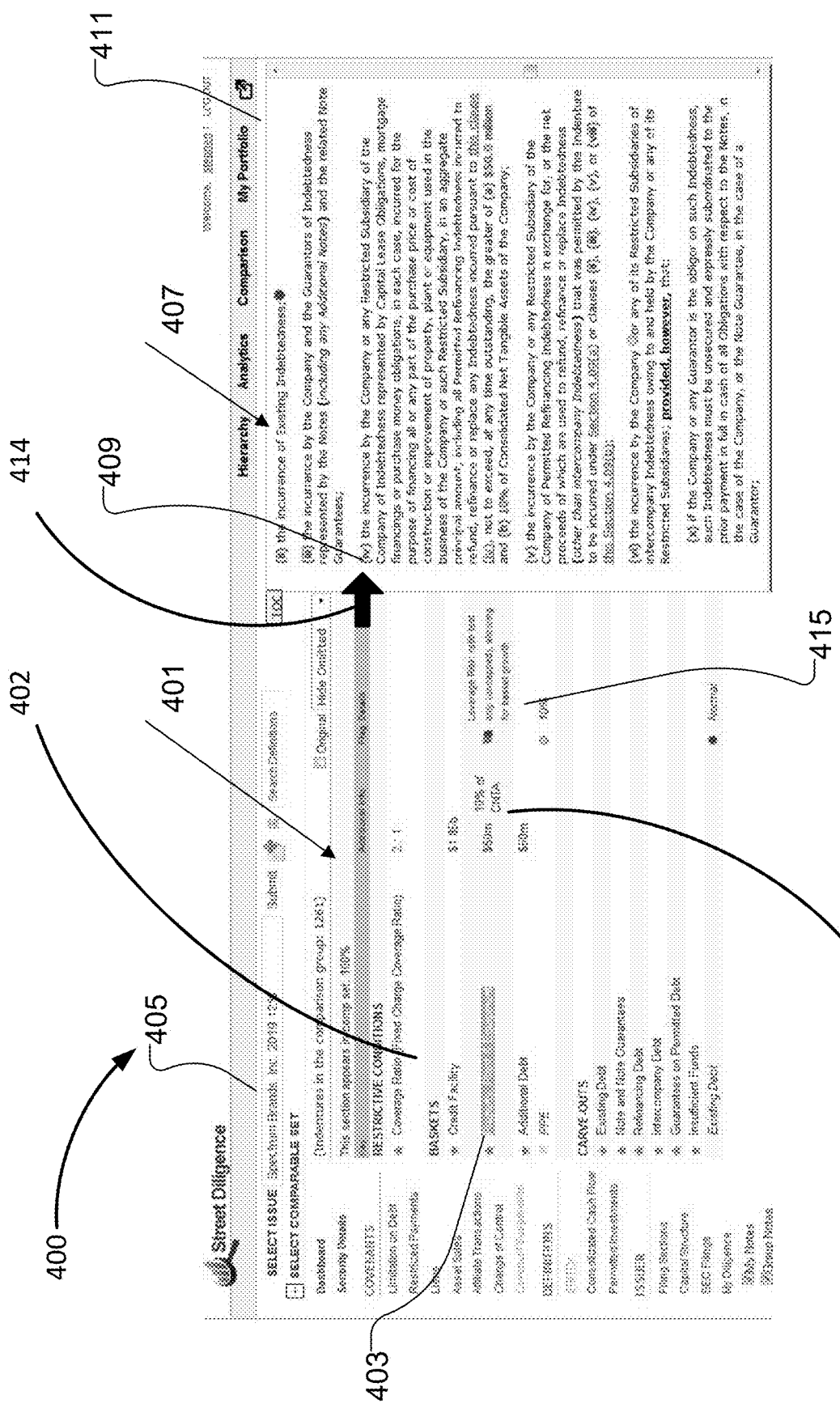
FIG. 4A schematically illustrates an embodiment of a display screen having an analytics frame (in a left-hand frame in this embodiment) and a document frame (in a right-hand frame in this embodiment)
Figure 4B:
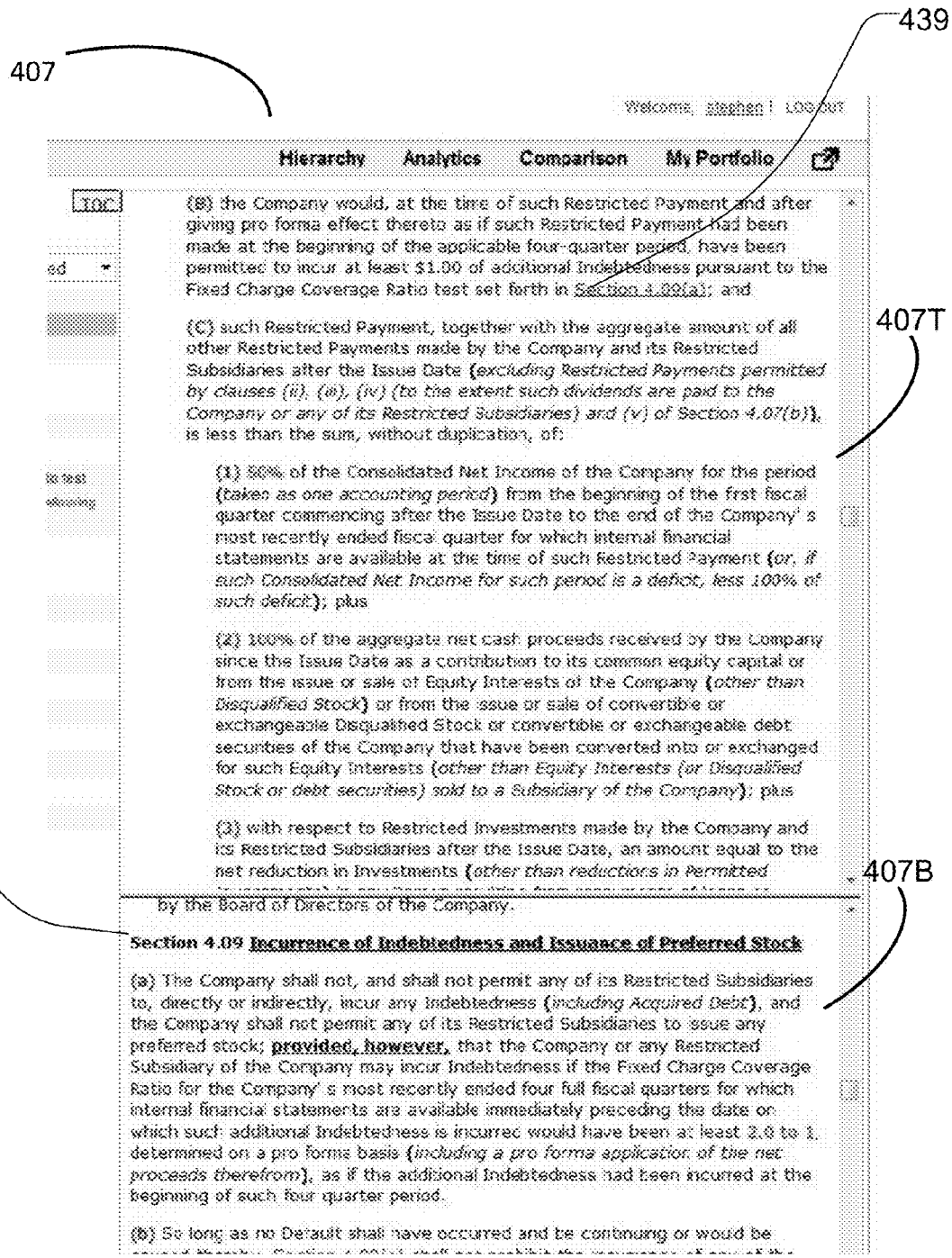
FIG. 4B schematically illustrates an embodiment of a document frame having two panels.
Figure 4C:
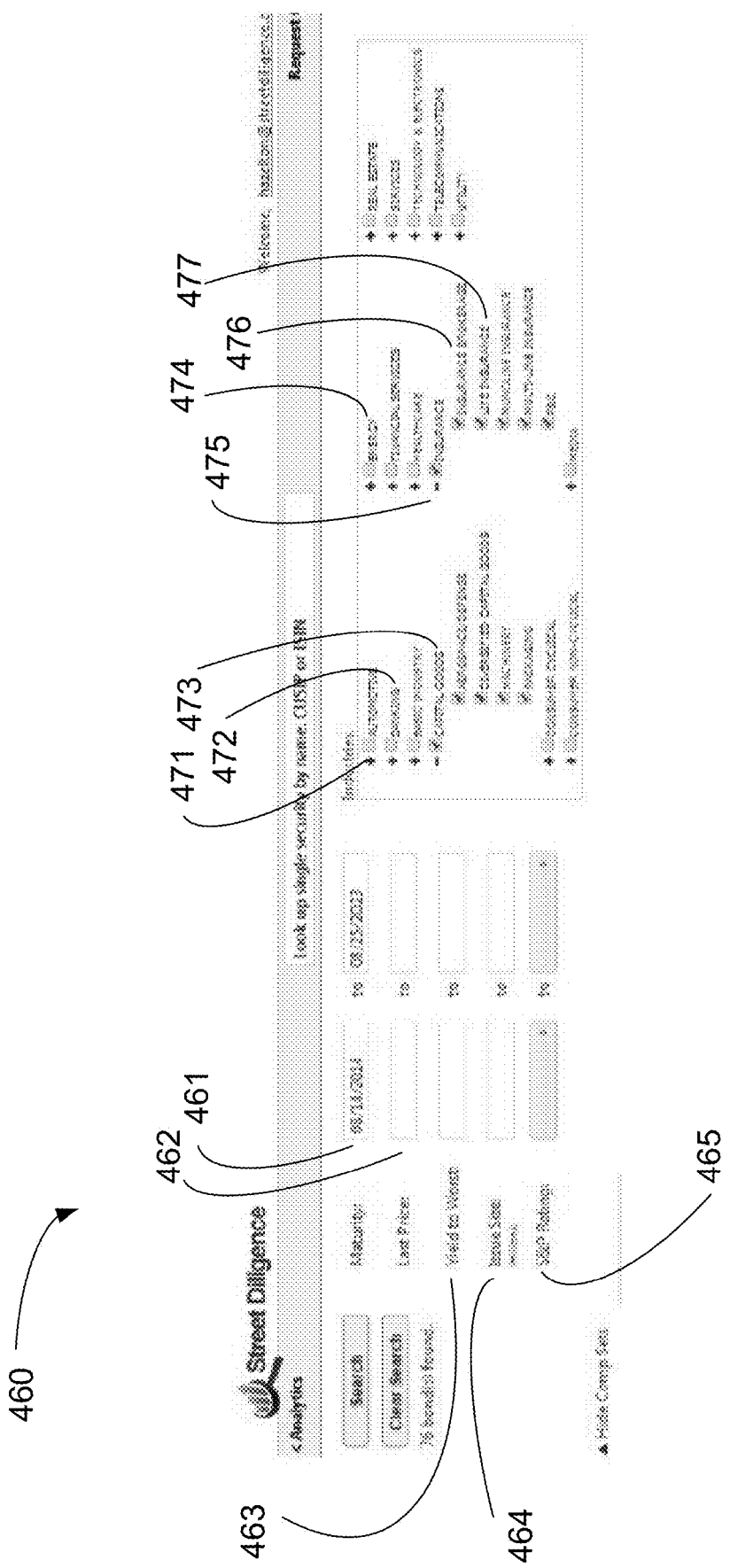
FIG. 4C schematically illustrates an embodiment of a user interface screen for defining a relevant population of documents.

The records of the database 320 store, for each document, analytical information such as substantive details extracted from the document (e.g., type of document; identity of issuer; dates, types of clauses contained in the document, types of clauses that are not contained in the document, etc.), as well as other characteristics of or description of the document and/or its issuer, such as information describing the issuer's industry (e.g., Automotive" 471, "Banking" 472, "Capital Goods" 473, "Energy" 474, and "Insurance" 475, to name but a few examples; see generally FIG. 4C). Some embodiments further record information about sub-sections of some industries, such as "Insurance Brokerage" 476 and "Life Insurance" 477 within the "Insurance" 475 category, for example. This data may be used by the user, for example via a user interface (see, e.g., FIG. 4C).

At step 203, the data retriever module 310, or in some embodiments, the user interface module 301, retrieves a document (e.g., in a PDF form or an html format, for example) from a file storage system module 330, which may be stored at server 151 or database server 181 for example. In some embodiments, the document may be a source document relating to one of a financial instrument or the issuer of a financial instrument.

Step 204 is optional. At this step, the file storage system module 330 may retrieve one or more documents from a remote source 340, which may be stored on a remote computer such as computer 181 for example. In some embodiments, the remote source may include the EDGAR database available from the U.S. Securities and Exchange Commission ("S.E.C."), to name but one example.

At step 205, the user interface module 301 receives the data responsive to the user's request, and displays that data in a first frame that occupies a first portion of the screen on the user's computer (e.g., on a display screen 103). Also at step 205, the user interface module 301 receives the document from the file storage system as described above, and displays at least a portion of that document in a second frame that occupies a second portion of the screen on the user's computer. The first frame and second frame are displayed on the user's computer such that both frames are visible to the user at the same time. In some embodiments, the first frame and second frame, and the data and documents displayed therein, may be transmitted and displayed as web pages.

Figure 2B:
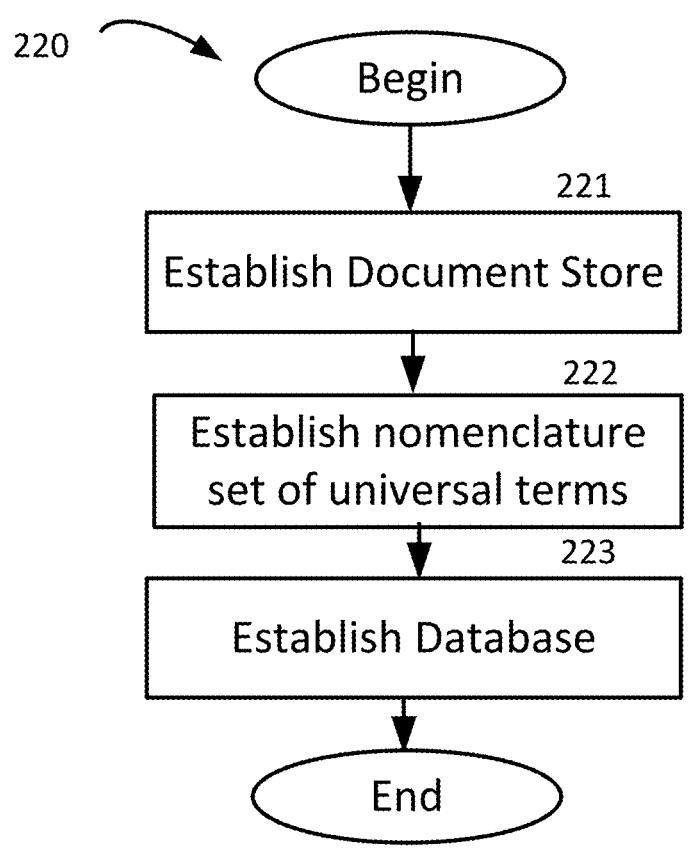
FIG. 2B and FIG. 2C schematically illustrate flow charts for preparing data resources for use in various analyses.

FIG. 2B schematically illustrates a method 220 of preparing data useful for various analysis described herein. The steps of method 220 may be performed in the order shown in FIG. 2B, although some steps may be performed outside that order.

At step 221, the method 220 establishes a file storage system (e.g., system 330) for storage of documents, such as original document and supplemental documents for example. For example, the file storage system may be as simple as a folder established by a user of a Microsoft Windows operating system. The file storage system (330) may be updated from time to time to add new documents as they become available.

At step 222, the method establishes a nomenclature set of universal terms, such as Business labels for example. A nomenclature set of universal terms may be established by a user, for example, based on a study of the content other documents. A term may be a "universal term" even if it does not appear in all documents.

At step 223, the method 220 establishes a database (e.g., database 320) configured to store the nomenclature set of universal terms, as well as other data, such as links, data parsed from documents, and analytic data generated by analysis of documents, for example. For example, the database may be an SQL database generated by a user of Microsoft's SQL software. Step 223 stores the nomenclature set of universal terms in the database.

Figure 2C:
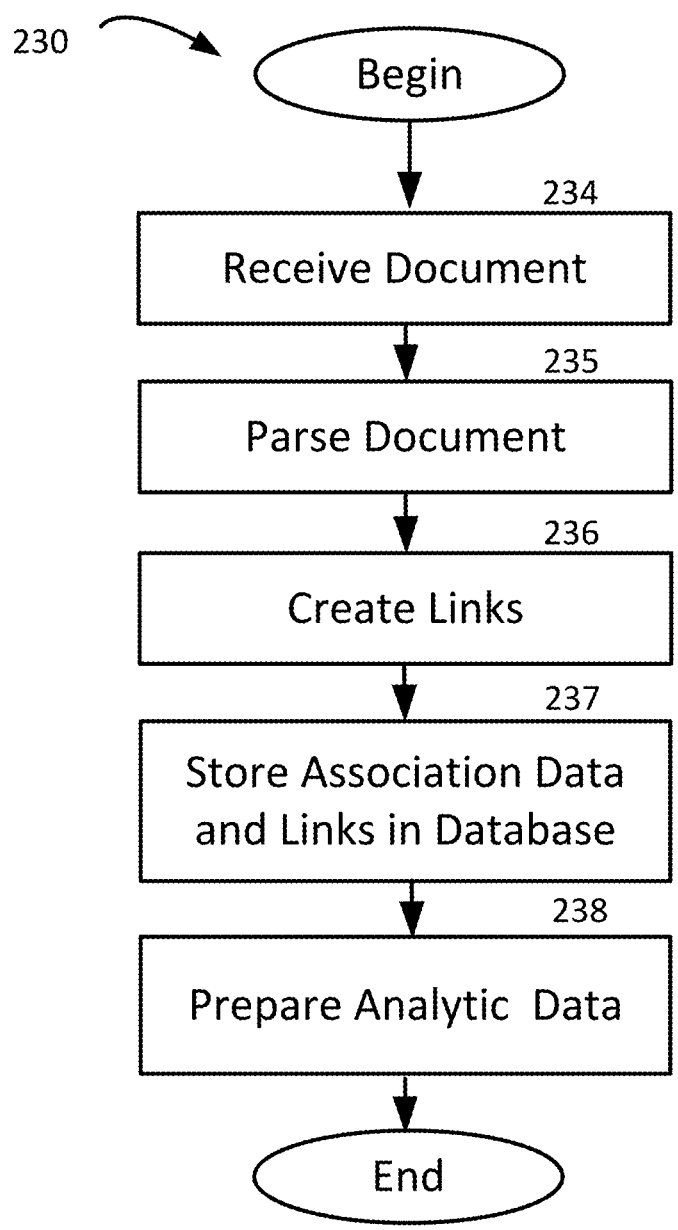

FIG. 2C schematically illustrates a method 230 of analyzing a document and preparing it for display.

At step 234, a new document is received and stored in the file store (330). In some embodiments, step 234 may include retrieving a document from another source, such as the S.E.C's Edgar database, for example.

Step 235 parses the instrument to identify text strings, if any, in the document, which text strings pertain to a specific business or legal concept, and associates each such string with at least one of the universal terms. For each universal term for which the parsed document includes a pertinent text string, step 235 also generates an association datum indicating that the parsed document includes a text string associated with that universal term. Step 236 creates links (e.g., hyperlinks) coupling each such string to its associated universal term. Then, data coupling each such text string with its corresponding universal term (collectively, the "association data"), and the links, are stored in the database (320), at step 237. If the document is a supplemental document, e.g., a document that modifies a term in an original document, then step 236 may also create a link to the text string in the original document. The actions of step 235 may be performed, for example, by a user working with the documents using a computer.

Optional step 238 may then prepare analytic data from the association data in the database (320), which may include data parsed from some or all of the documents previously parsed. For example, analytic data may include a percentage indicating what portion of documents, within a set of documents, include a given clause. The analytic data may be determined as the ratio of documents having a given datum to all documents within the set of documents. Such data preparation may be performed by a user reviewing the data in database 320, or may be automated with software.

FIG. 4A is a schematic representation of a display screen 400, in accordance with an embodiment, showing in a left-hand frame 401 Business labels, analytical information and flags pertinent to a financial instrument, and, in a right-hand frame 407 (which may be known as a "document frame" or "reading frame"), one or more source documents 411 also pertinent to the financial instrument. As described below, it can be seen that the display screen visually correlates at least a set or subset of universal terms (e.g., Business labels) with contents and structures in the displayed financial instrument.

In this figure, one can see that the issuer is identified in item 405 as Spectrum Brands, Inc., and item 405 also indicates that the financial instrument is a 12% bond due in 2019. One of the Business labels in the left-hand frame 401 is item 403, Property, Plant, & Equipment. This Business label is highlighted because it has been selected by the user. Selection of this Business label causes a relevant string of text in the source document to be displayed in the right-hand frame 407, and the relevant string of text 409 is indicated to the user by the black arrow 414, appearing in the display. The display of the Business label 403 also includes analytical information 413 relevant to the financial instrument being analyzed. In this example, the analytical information 413 includes information to indicate the instrument includes a limitation on the incurrence of indebtedness relating to Property, Plant, & Equipment in excess of $50M) or "10% of CNTA," which information is include in a clause "(iv)" of the source document 411 as shown in frame 407. The display of the Business label 403 also includes a flag 415 to alert the user that the analytical information presents, or may present, a "Leverage Risk" ["Leverage Risk: ratio text only (uncapped), allowing for basket growth"].

FIG. 4B schematically illustrates a document panel 407 having two sub-panels 407T and 407B. Each sub-panel 407T and 407B may display different documents, or different portions of a single document, to further enhance the conveyance of information to the user.

In the embodiment of FIG. 4B, sub-panel 407T displays a document 441, in this example the document 411 includes a linked reference to a portion 439 of a document ["Section 409(a)"] which portion 439 may be in the document 411, or in another document (e.g., an original document or a supplemental document, to name just two examples). When the user clicks on the linked reference 439, the other panel 407B displays the referenced section 411 in the context of its native document.

FIG. 4C schematically illustrates a user interface 460 that allows a user to define a group of financial instruments against which to analyze another financial instrument. The group, defined by common characteristics, may be referred to as "relevant population" of such documents. A user may, for example, operate the user interface 460 as part of defining a request at step 201. In operation, the user may select features of the financial instruments to be included in the relevant population. The characteristics presented by the user interface 460 may correlate, for example, to the data stored in the database 320.

As schematically illustrated in the example of FIG. 4C, the user interface 460 offers the user the ability to specify a variety of criteria to define a relevant population. For example, a user may specify a date or range of dates in which an instrument will mature 461, a "last price" or range of instrument last prices 462, a percentage or range of percentages of "Yield to Worst" 463, an issue size or range of issue sizes 464, and a credit (e.g., S&P) rating or range of credit ratings 465.

In the example of FIG. 4C, a user has specified that instruments within a relevant population of instruments are those that have a maturity date between Aug. 14, 2014 and Aug. 25, 2014 (461) and issued by issuers in the "Capital Goods" 473 industry and in the "Insurance" industry 475. As such, the relevant population of documents will include those documents that are issued by issuers in any of the sub-sectors of the Capital Goods industry and sub-sectors of the "Insurance" industry. Consequently, data from the database 320 relating to the documents within the relevant population of documents may be retrieved at step 202.

Figure 4D:
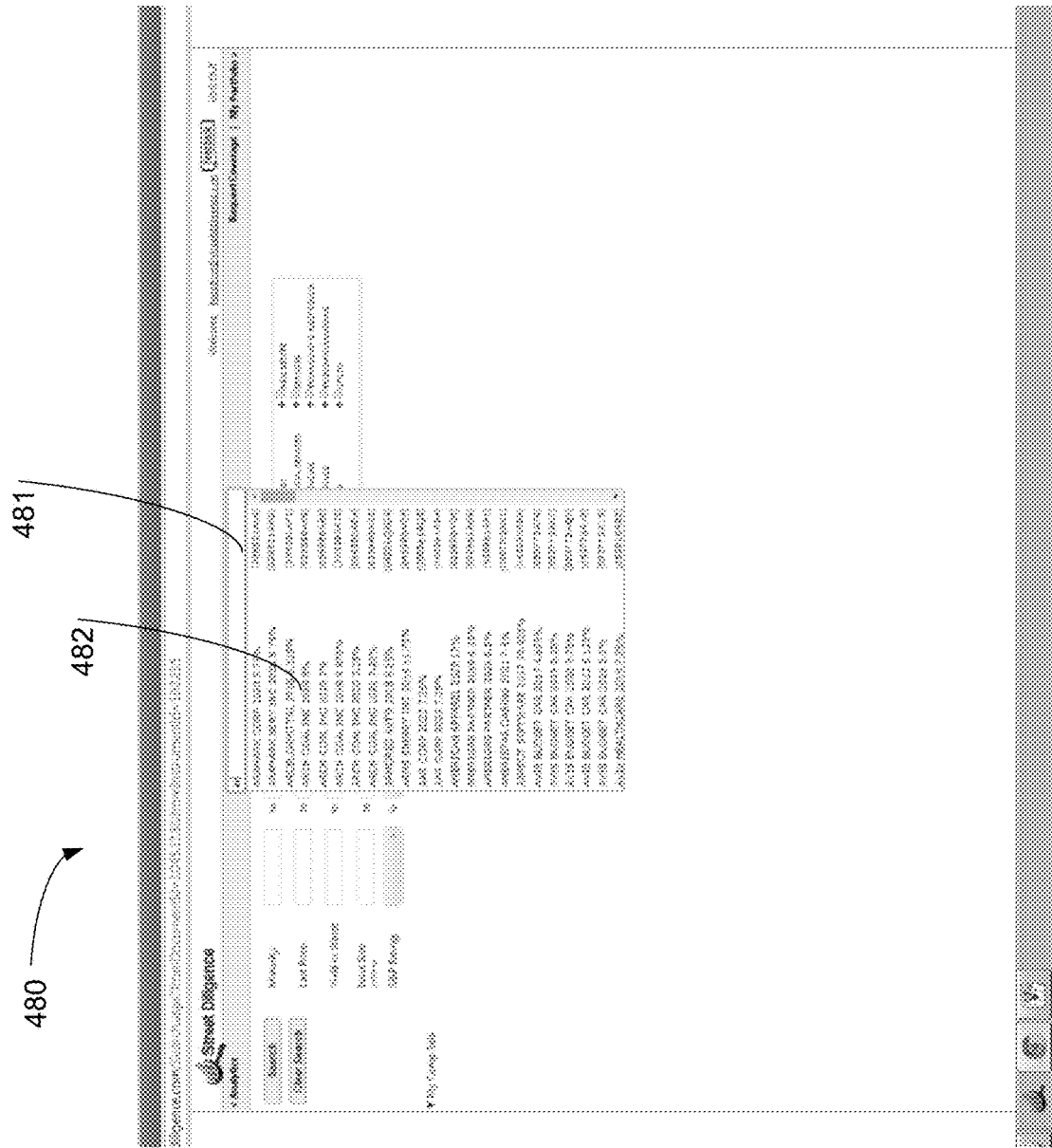
FIG. 4D schematically illustrates an embodiment of a user interface that allows a user to select a financial instrument to be analyzed against a group of financial instruments.

FIG. 4D schematically illustrates an embodiment of a user interface 480 that allows a user to select a financial instrument to be analyzed against a group of financial instruments (e.g., a relevant population). Using the user interface 480, the user may search for a financial instrument by entering search terms (e.g., name, ISIN, CUSIP) into search box 481, and then select a financial instrument from among a list 482 of financial instruments responsive to that search term.

Figure 4E:
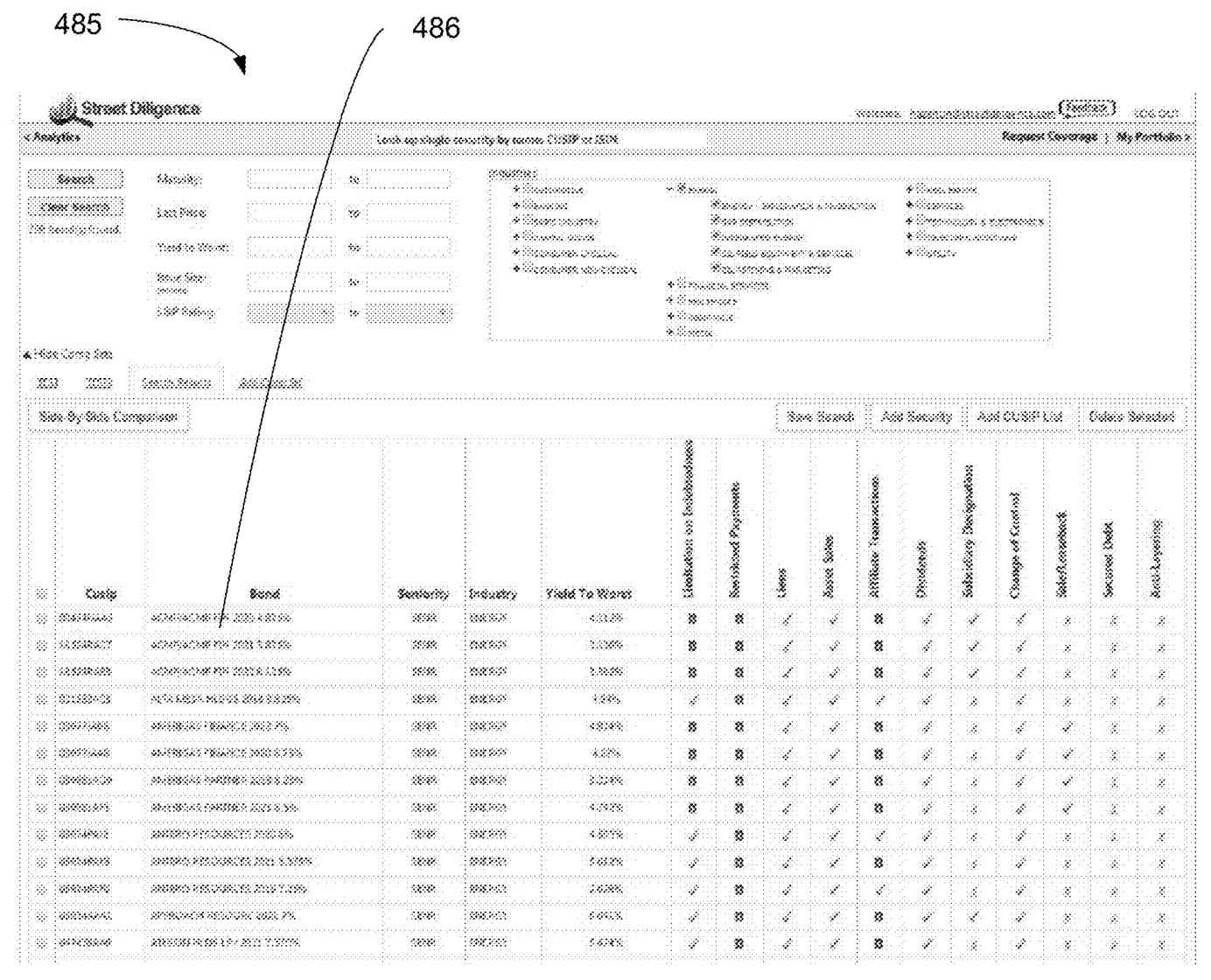

FIG. 4E schematically illustrates an alternate embodiment of user interface 485 that allows a user to select a financial instrument to be analyzed against a group of financial instruments (e.g., a relevant population). The content of the user interface 485 may be generated by the user by specifying parameters in the interface of FIG. 4C, for example. The user interface 485 presents to the user a listing 486 of some or all of the documents from the database 320, and the user can then select a financial instrument from among the list 486 of financial instruments.

Selection of financial instrument to be analyzed against a group of financial instruments, for example as described in connection with the foregoing user interfaces, may be part of defining a request in step 201.

Figure 5:
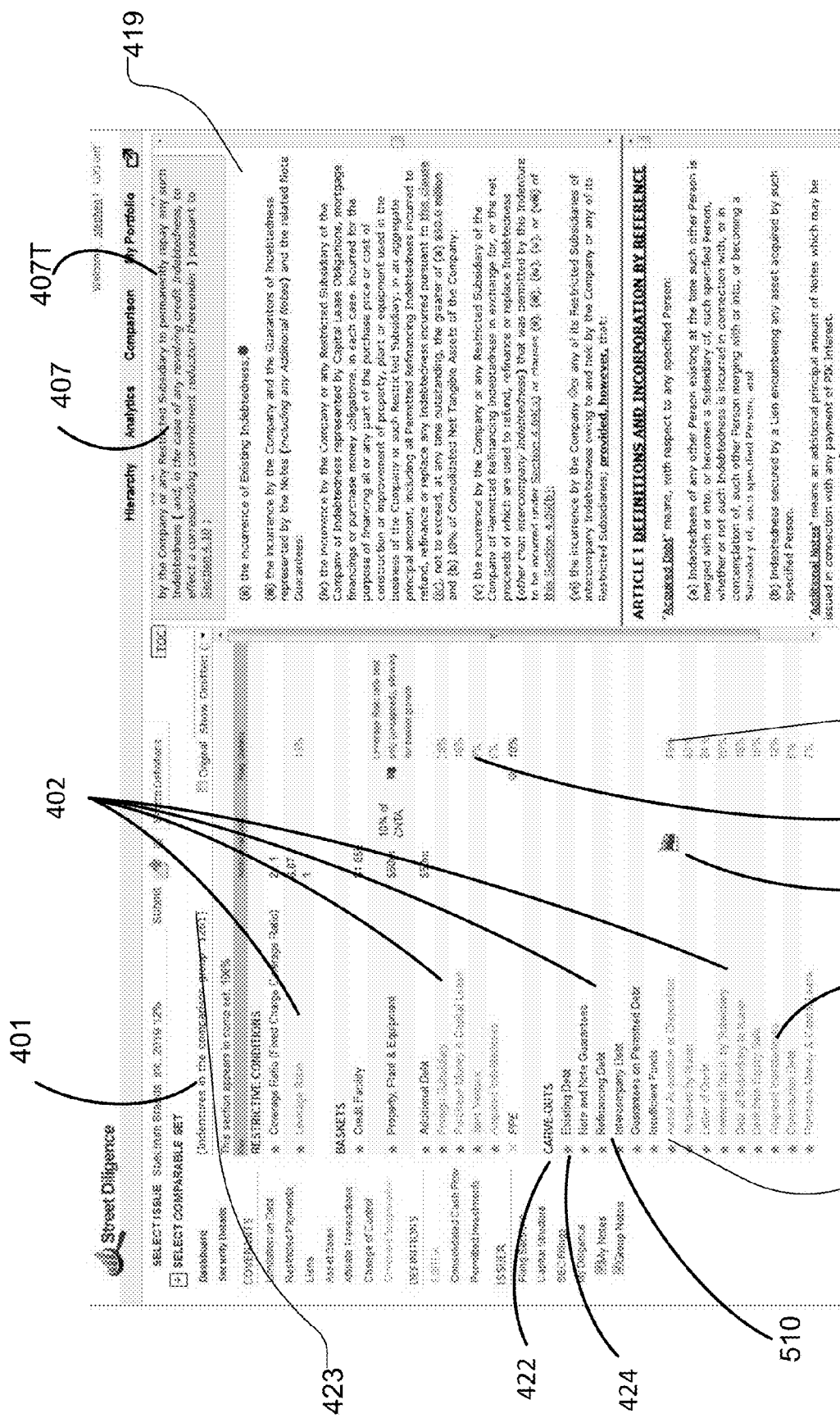
FIG. 5 schematically illustrates an embodiment of a display screen having an analytics frame (in a left-hand frame in this embodiment) and a document frame.

Some embodiments develop statistics based on the data for the relevant population. For example, based on information in the database 320, some embodiments may determine what percentage of documents, within the relevant population, contains a given clause. Such information may later be displayed to the user. For example, as schematically illustrated in FIG. 5, 49 percent of financial instruments within a relevant population of financial instruments 423 (identified as "group 1261") include an "Asset Acquisition or Disposition" carve-out clause 417. Note that in FIG. 5, the document being analyzed does not contain an "Asset Acquisition or Disposition" carve-out clause 417, as indicated by the fact that Business label "Asset Acquisition or Disposition" 417 is displayed to the user in a manner that is graphically distinct (in this example, displayed faintly, but could also be displayed bolder, or in italics, or underlined, or in a different font or font size, or otherwise in a distinctive manner) as compared to other Business labels (e.g., "Existing Debt" 424) within the "Carve-Outs" section (422) of the displayed screen.

FIG. 5 is a representation of a display screen, in accordance with the embodiment referenced in FIG. 4A, showing, for the same financial instrument, in a right-hand frame 407, the same source document 419 pertinent to the financial instrument, and, in a left-hand frame 401, an identification of Business labels 402 that are present (510) in the source document and additional Business labels (520), pertinent to the same general class of financial instrument, that are lacking in the source document. By comparing and contrasting the Business labels present in a particular financial instrument to all Business labels found in a collection of financial instruments of same general class (e.g., which may be defined by the user as the relevant population), a display of Business labels present (510) and not present (520) is generated between the particular financial instrument and those of the same general class. This is done by displaying Business labels in the following manner: Business labels present (510) in the particular financial instrument appear in black font in the left-hand frame 401; Business labels (520) present in the same general class of financial instrument but not in the particular financial instrument appear in light brown font in the left-hand frame 401. A statistical measure (421) of frequency is also displayed alongside the light brown Business labels displaying the frequency for which the particular Business label appears in the same general class of financial instruments.

Figure 6:
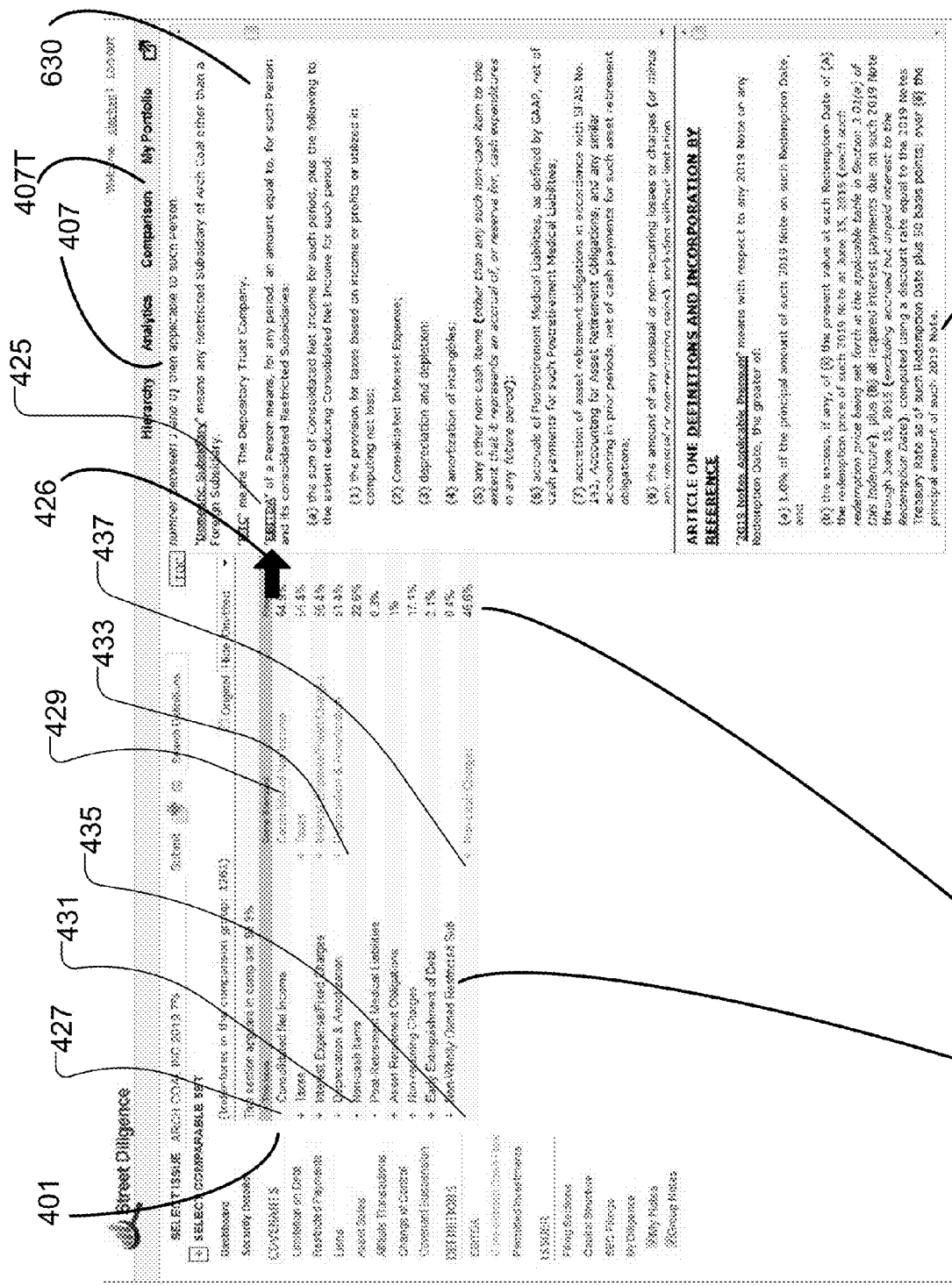
FIG. 6 schematically illustrates an embodiment of a display screen having an analytics frame (in a left-hand frame in this embodiment) and a document frame.

FIG. 6 is a representation of a display screen, in accordance with the embodiment referenced in FIG. 4A, showing, for another financial instrument, in a right-hand frame 407, a source document 630 pertinent to the financial instrument, wherein the source document 630 is open to a formula 425 (indicated by arrow 426) defining (e.g., 435) the components of the EBITDA calculation, and in a left-hand frame 401, Business labels 402 that are present in the formula (e.g., business label 431) as well as Business labels, pertinent to such a formula in the same general class of financial instrument, that are lacking in the displayed formula (e.g., business labels 433; 437). By comparing and contrasting the Business labels present in a particular formula of a financial instrument to formulas of the same general class found in a collection of financial instruments of same general class, a display of Business labels present and not present is generated between the formulas of the particular financial instrument and those of the same general class. Such display is done in a side-by-side view of Business labels in the following manner: Business labels present in the particular financial instrument's formula 427 appear in black font on the left column of the left-hand frame 401; Business labels 429 present in the formulas of the same general class of financial instrument appear in light brown font in the right column of the left-hand frame 401. Thus, Business labels 427, 429 appearing in left and right columns are present in the particular financial instrument's formula and the same general class of financial instrument's formula; Business labels 427 appearing only in the left column are present only in the particular financial instrument's formula; Business labels 429 appearing only in the right column are present only in the same general class of financial instrument's formula. One or more statistical measures 430 (each of which is analytical information) of frequency is also displayed in the far right column in the left-hand frame 401 displaying the frequency for which the particular Business label appears in the same general class of financial instrument's formula.

In some embodiments, the first frame 401 may display a flag 555 to indicate that a given Business label is common (e.g., included in at least 45 percent of the instruments within the relevant population against which an instrument is being analyzed), or is uncommon (e.g., included in fewer than 55 percent of the instruments within the relevant population against which an instrument is being analyzed). In some embodiments, the percentage (of instruments within the relevant population against which an instrument is being analyzed) that makes a given Business label common or uncommon may be specified by the user. Alternately, in some embodiments, such a percentage may be pre-set as a default setting.

Figure 7:
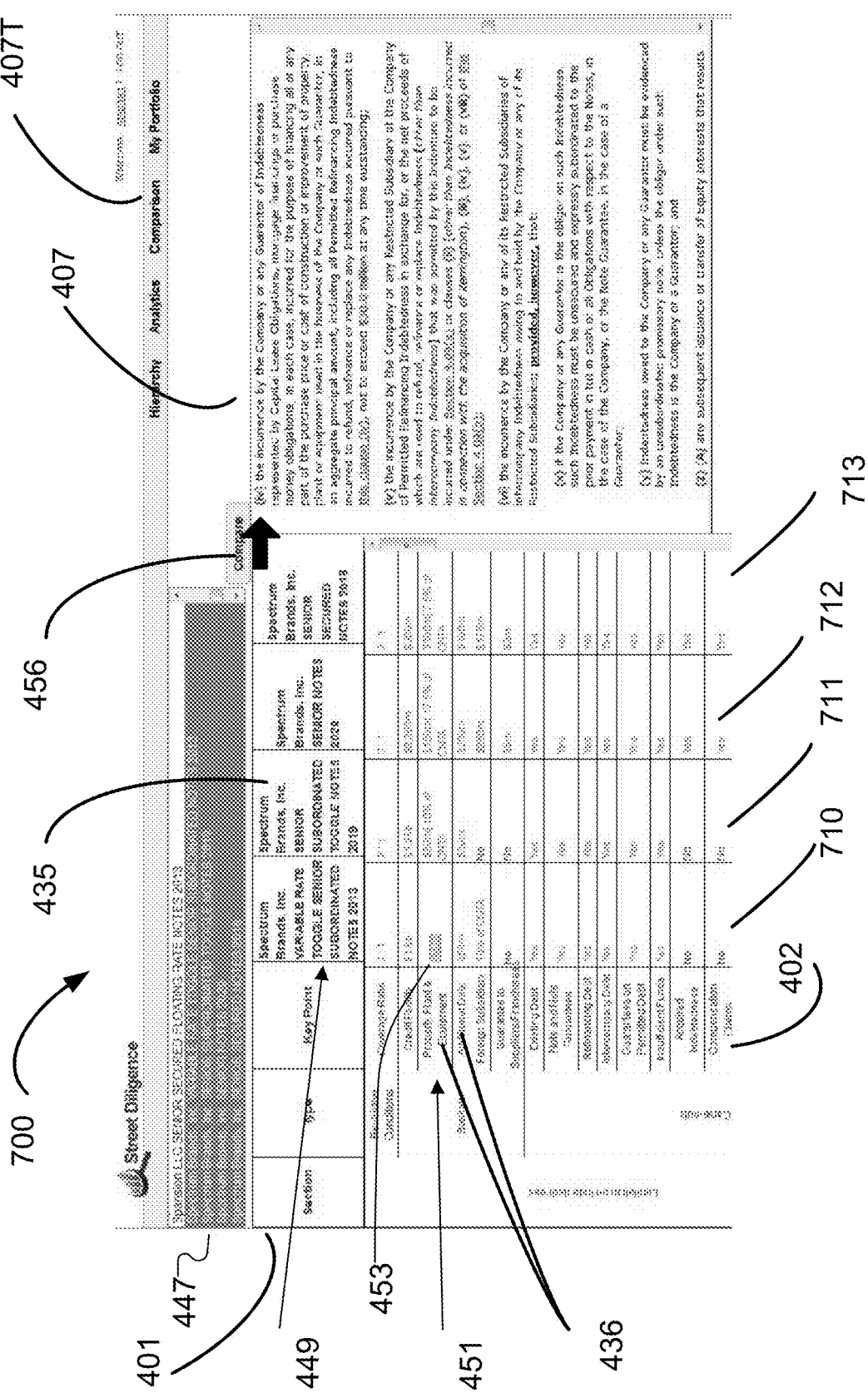
FIG. 7 schematically illustrates an embodiment of a display screen having an analytics frame (in a left-hand frame in this embodiment) and a document frame.

FIG. 7 is a representation of a display screen 700 showing, in the left-hand frame 401, a cross comparison of Business labels 402, 451 and analytical information 435 pertinent to financial instruments of a particular set of issuers (447), and, in the right-hand frame 407, a source document pertinent to one of the financial instruments. Business labels, appearing in the left portion of the rows in the table in the left-hand frame 401, and the pertinent analytical information, appearing in the corresponding right portion of the rows 436 in the table in the left-hand frame 401, correspond to the financial instrument displayed at the top of each corresponding column (710; 711; 712; 713) in the table in the left-hand frame 401. The $30M analytical data point 453 selected by the end user and shown by the grey highlight corresponds to the Business label 451 for Property, Plant & Equipment found in the financial instrument identified as Spectrum Brands, Inc. Variable Rate Toggle Senior Subordinated Notes 2013 (449, column 710). The particular string of text represented by the particular Business label is displayed in the source document pertinent to this financial instrument in the right-hand frame 407 and indicated to the user by the black arrow 456 appearing in the display.

Figure 8A:
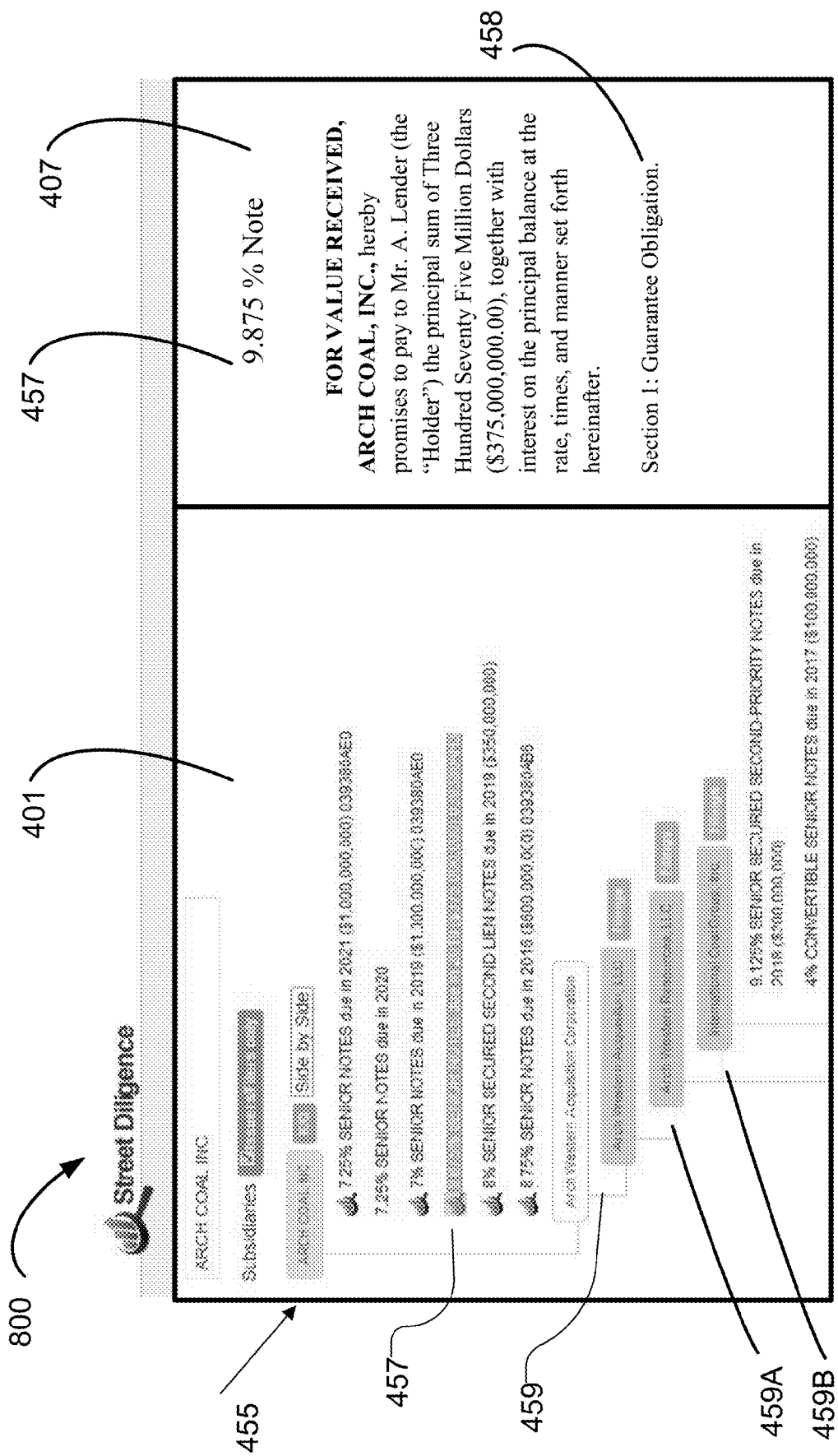
FIG. 8A schematically illustrates an organizational chart of an entity and its affiliated entities.

FIG. 8A is a schematic representation of a display screen 800 showing, in the a left-hand frame 401, graphical representation of entities (e.g., 455, 459, 459A, 459B) and financial instruments (e.g., 457) as they relate to a particular financial instrument and issuing entity, and in a right-hand frame 407, a source document wherein the source document is open to a description of the particular relationship. The grey highlight of the 9.875% Senior Notes due in 2019 ($375,000,000) 039380AH3 represents the selection of this particular financial instrument issued by Arch Coal, Inc., the entity represented within a grey box 455. Arch Western Acquisition, LLC 459, Arch Western Resources LLC 459A and International Coal Group, Inc. 459B are highlighted in green, representing a guarantor obligation to the bondholders of the particular financial instrument. The particular string of text 458 pertinent to the guarantee obligation is displayed in the right-hand frame 407.

Figure 8B:
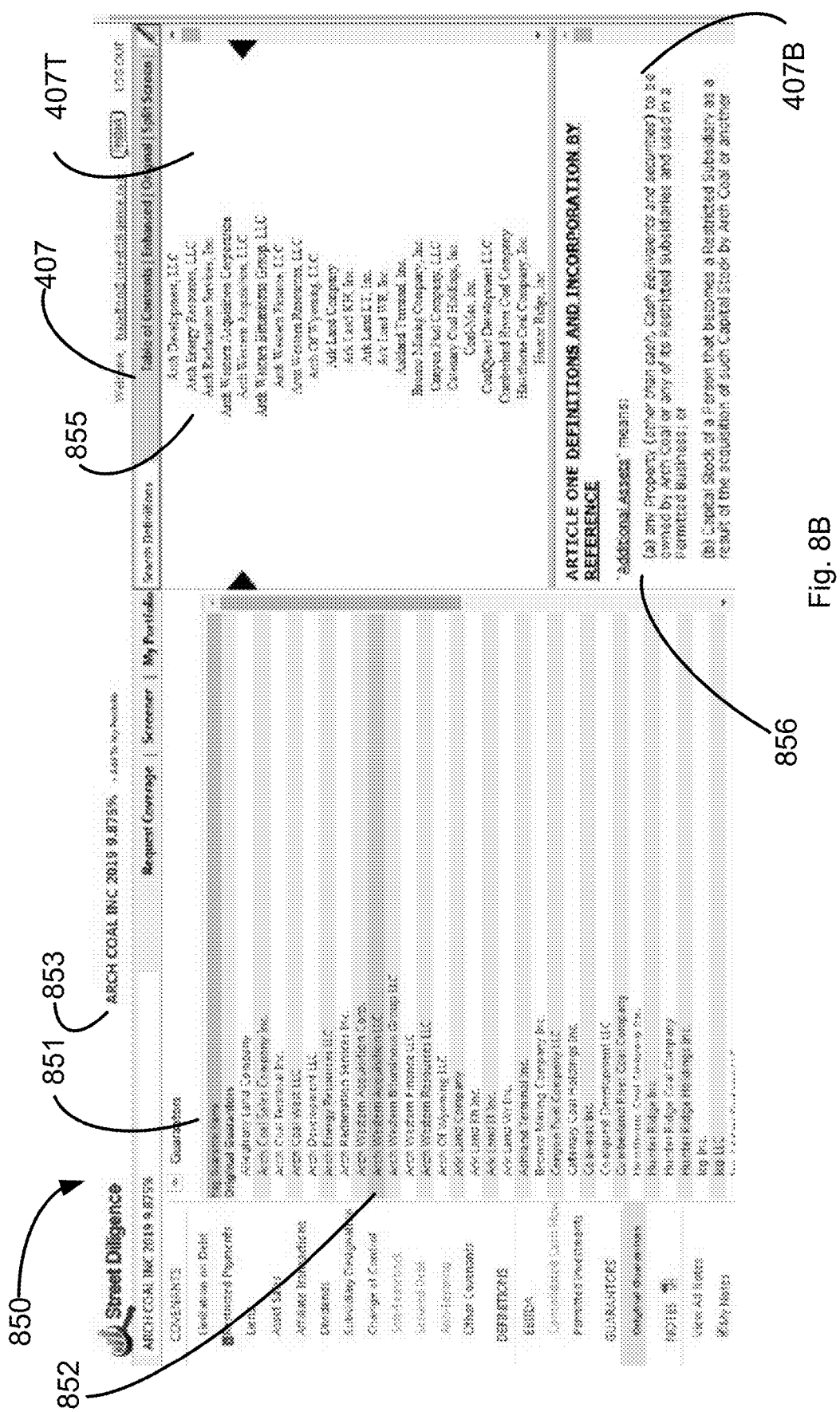
FIG. 8B schematically illustrates a display graphically illustrating a relationship between a financial instrument and its guarantors.

FIG. 8B is a schematic representation of a display screen 850 showing, in the left-hand frame 401, a list 851 of (guarantor) entities as they relate to a particular financial instrument and issuing entity, and in the right-hand frame 407, a source document 855 wherein the source document provides auditability of the particular relationship. The highlighted display 852 of the Arch Western Acquisition LLC entity represents the guarantee of payment by this particular entity of the financial instrument 853 issued by Arch Coal Inc. due in 2019 and paying 9.875% interest. Arch Western Acquisition LLC, among other entities listed, represents a guarantor obligation to the bondholders of the particular instrument. The particular string of text 856 pertinent to the guarantee obligation is displayed in the source document pertinent to this financial instrument in the right-hand frame 407.

Figure 9:
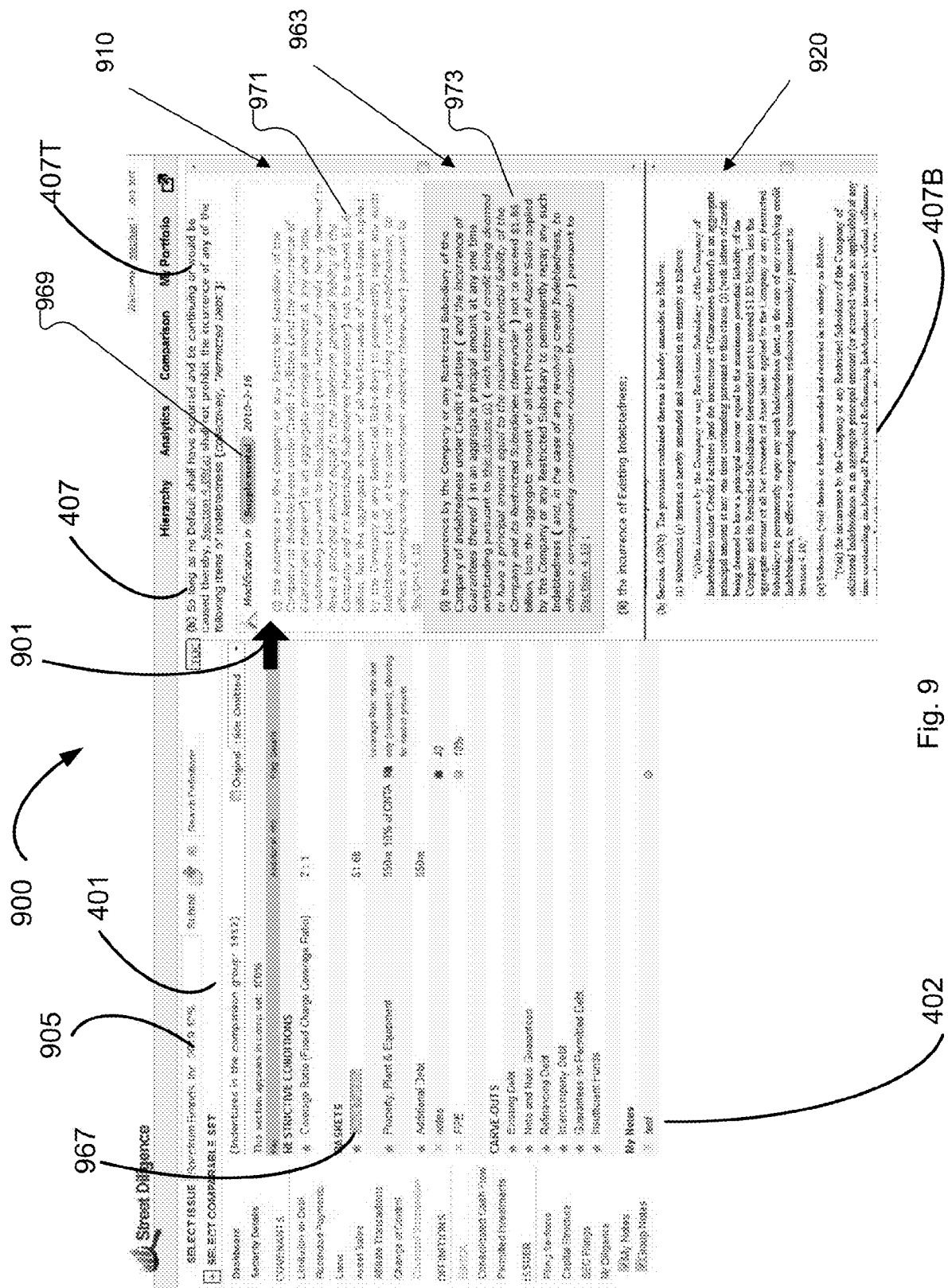
FIG. 9 schematically illustrates an embodiment of a display screen having an analytics frame (in a left-hand frame in this embodiment) and a document frame.

FIG. 9 is a schematic representation of a display screen 900, showing for a financial instrument 905, in the left-hand window 401, a collection of Business labels 402, and in the upper right-hand sub-frame 407T of frame 407, a source document 910 pertinent to the financial instrument 905, where in the source document 910 is open to a string of text 971, indicated by arrow 901, particular to the selected Business label 967 highlighted in grey; and in the lower right-hand sub-frame 407B, a string of text 920 source supplemental document 969 pertinent to the financial instrument 905 where the source document is 910 open to a modified version of the string of text particular to the Business label 967. The blue (or grey) highlight of the "Credit Facility" Business label 967 of the 12% Spectrum Brands, Inc. financial instrument due in 2019 relates to the original string of text 971 in grey font in the right-hand window 407. The blue (or grey) highlighted (963) string of text 973 in the right-hand sub-frame 407T indicates a modification (found in a supplemental document 969) to the string of text 971 in the original document 905. The string of text 973 displaying the modification may then be compared and contrasted to the string of text 971 from the original document 905.

Figure 10:
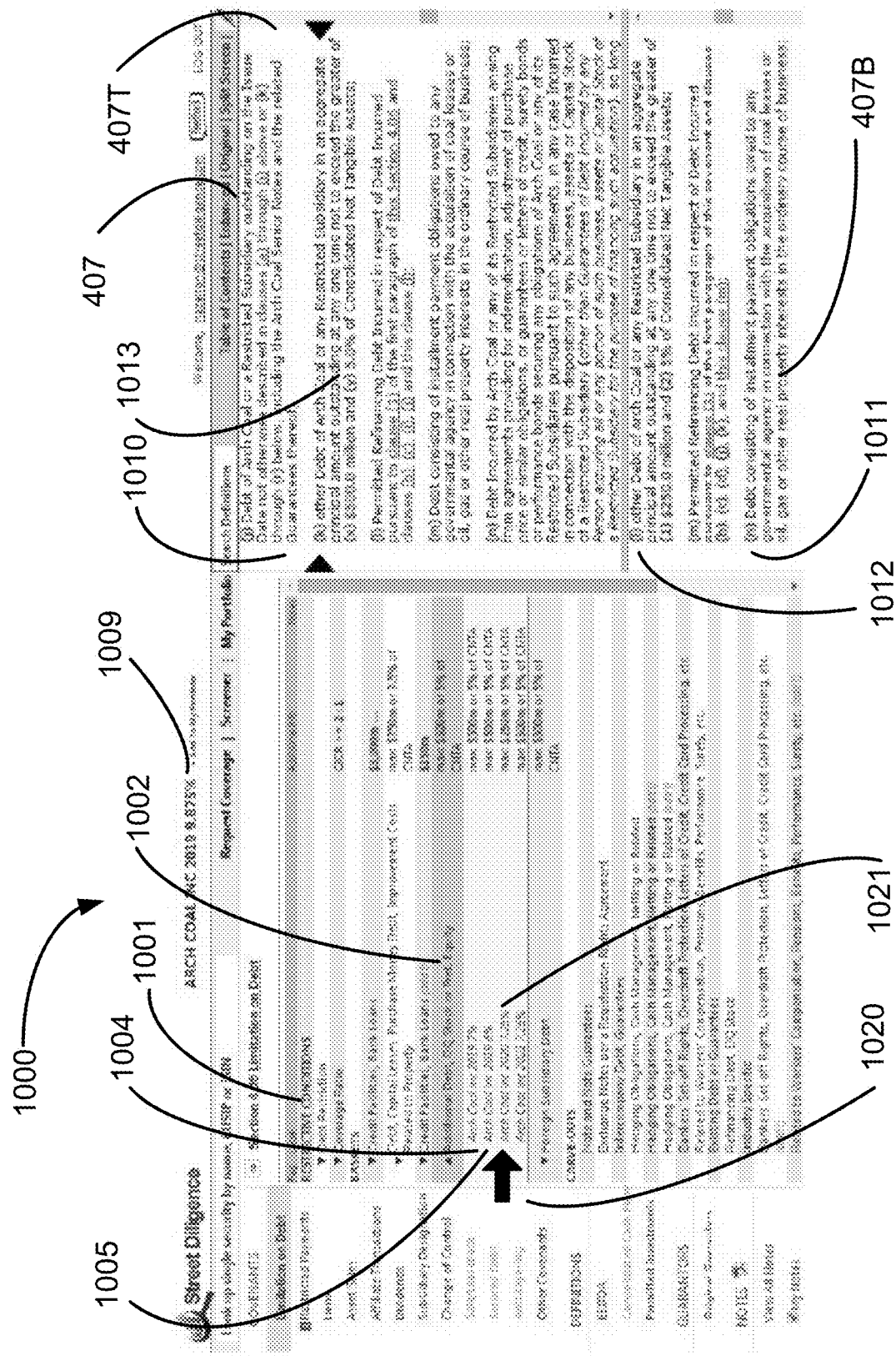
FIG. 10 schematically illustrates an embodiment of a display screen having a first frame showing, for a financial instrument, a collection of Business labels 1001, a source document in a second frame, and a string of text from another document pertinent to the source document in a third frame.

FIG. 10 is a representation of a display screen 1000, showing for a financial instrument (in this example, the financial instrument is the "9.875% Arch Coal Inc. financial instrument due in 2019" as indicated by caption 1009), a collection of Business labels 1001 in the left-hand frame 401. One of those Business labels 1002 is shaded (light blue) and indicates that the financial instrument 1009 includes a clause for "Additional Debt, DQ Stock, Pref. Equity."

The (shaded) highlight of the "Additional Debt, DQ Stock, Pref. Equity" (1002) Business label of the 9.875% Arch Coal Inc. financial instrument due in 2019 (1009) indicates that the financial instrument 1009 being analyzed may be compared to other financial instruments issued by the entity or related entities of the company.

The lightly-shaded area 1004 below the shaded Business label 1002 displays the additional financial instruments (1005) in the entity's capital structure, financial instruments issued by related entities in the company's corporate tree and analytical information pertinent to the same Business label for each financial instrument.

The right-hand frame 407 displays documents in two sub-frames 407T and 407B. The documents displayed in those sub-frames 407T and 407B relate, respectively, to the Business label 1002 for the financial instrument 1009 being analyzed, and to another document represented by Business label 1021.

The upper right-hand sub-frame 407T displays a source document 1010 pertinent to the financial instrument 1009, where in the source document 1010 is open to a string of text 1013 particular to the selected Business label 1002 highlighted (shaded).

The lower right-hand sub-frame 407B displays a source document 1011 pertinent to the financial instrument where the source document 1011 is open to the string of text 1012 particular to the Business label 1021 indicated by the black arrow 1020. In other words, the selected Business label 1021 in shaded area 1004, indicated by the black arrow 1020, provides for the display of the string of text particular to this Business label's source document (e.g., 1011), which may then be compared with the particular string of text from the other, similar Business label 1002 and for which the particular string of text 1013 is displayed in the above right-hand frame 407T.

Some embodiments provide a user interface that allows a user to see a composite document created from an original document (e.g., a financial instrument; a source document) and one or more supplemental documents that modify the original document (e.g., amendments to the financial instrument). The user interface displays original text from the original document, and the later text as modified by the one or more supplemental documents, visible to a user as a merged document, rather than as separate documents.

Such embodiments may be useful, for example, to a user analyzing documents that are subject to amendment by other documents, such as legal contracts or financial instruments. Taking, as an illustrative example, an indenture that has been amended, a user analyzing the indenture must read multiple documents (the original document and all supplemental documents) to ascertain the prevailing language that governs the security. This is due to the fact that an original indenture was issued, and subsequently one or more supplemental documents modified or amended the original document.

These supplement documents do not often fully restate the original document, but rather they do one of (1) only restate the paragraph(s) being amended, (2) provide a description of the language changes implemented (e.g. insert the word "big" after the word "cat," but before the word "dog"), or (3) they red or black line changes they make to the language with "Track Changes" functionality.

This creates challenges for the analyst in ascertaining that he has in mind the current text of the document. For example, the analyst must ascertain that he has all of the supplemental documents, and that he analyzes them in order. Missing a supplement, or analyzing them in an order other than the order in which they were created, would lead to an erroneous reading of the modified document. This is a risk inherent in such an approach.

To address this challenge, this embodiment creates a "composite" document, which provides a view of the original document as modified by all supplemental documents, so that user can view the latest language in one image and easily identify the modification(s) through the red "A" (e.g., 1105), quickly identify the modified language through a Business label (e.g., 1103) that is labeled with a red "A" (e.g., 1105), and audit the "composite" document by clicking on the audit bar to either a) view the source document filed with the S.E.C. or b) view the source supplemental document detailing the change, as also filed with the S.E.C.

Figure 11A:
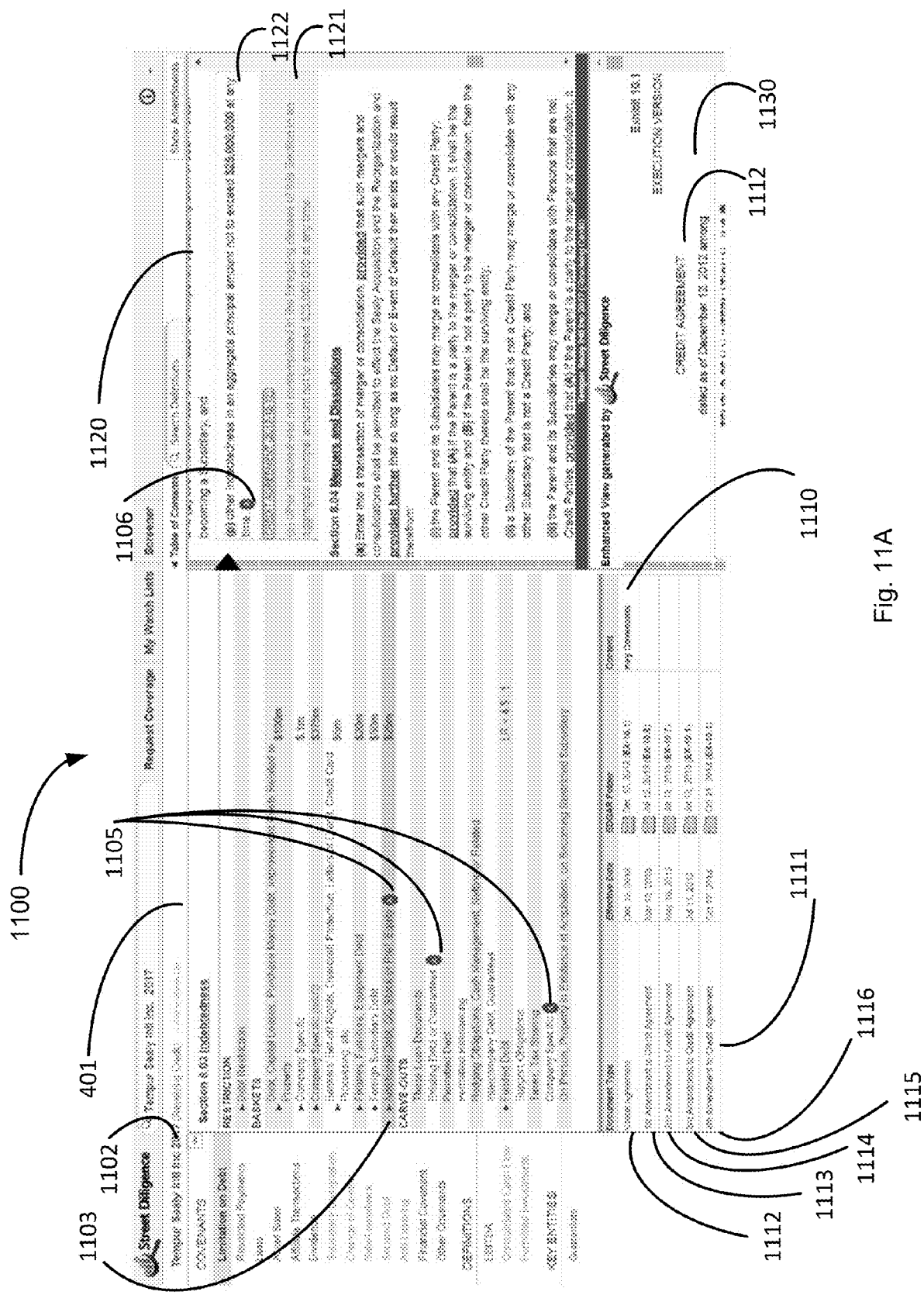
FIG. 11A and FIG. 11B schematically illustrate embodiments of a display screen providing a composite document created from source documents.
Figure 11B:
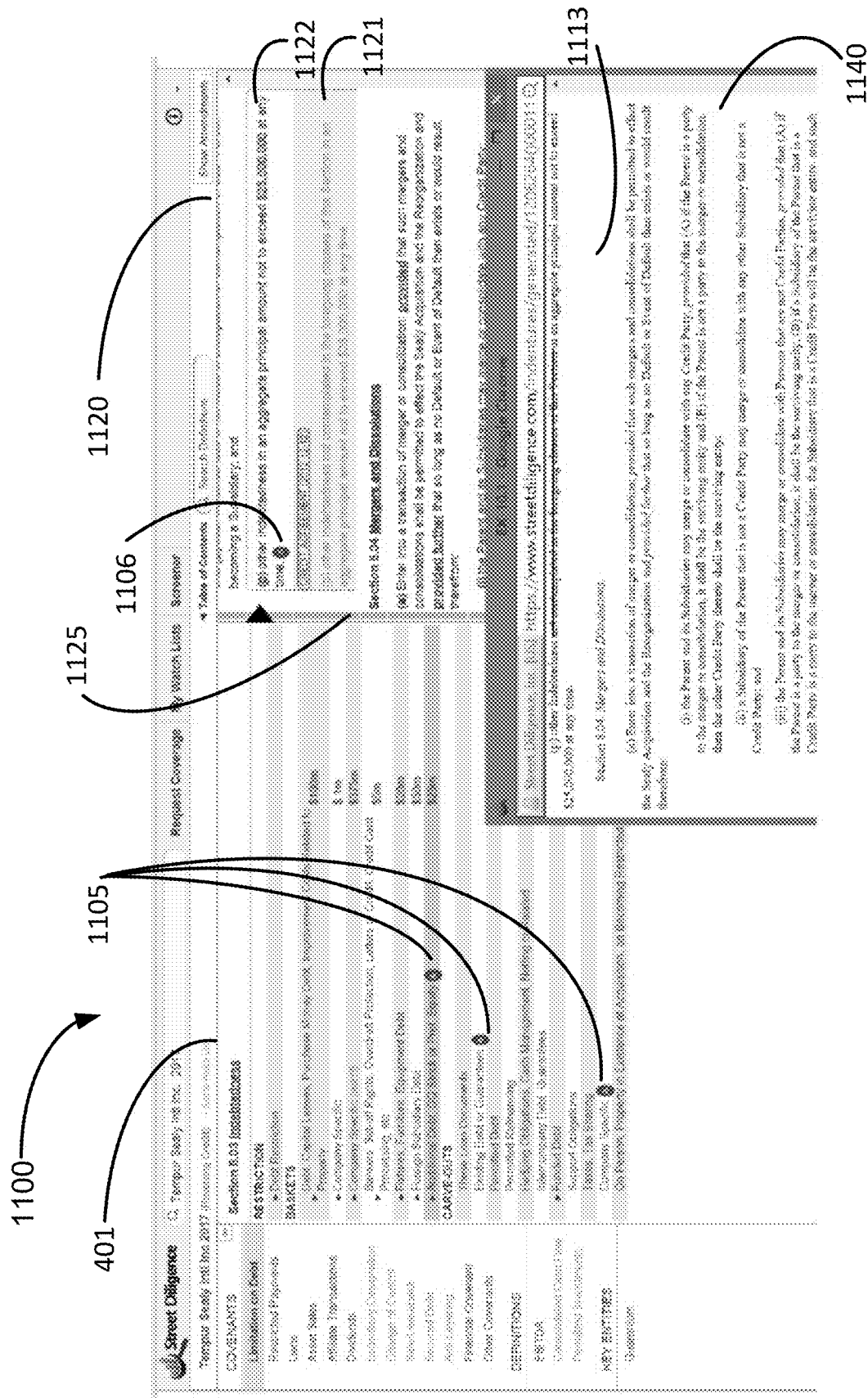

FIG. 11A and FIG. 11B schematically illustrate embodiments of user interfaces that provide to a user a composite view of an original document, and revisions to the original language of the original document, in the most up-to-date manner.

In FIG. 11A, a user interface 1100 includes several frames visible to a user.

An upper left frame 401 (which may be referred to as a "Business Label Frame," even though it may display information other than, or in addition to, Business Labels) displays information about an original documents, identified by text string 1102. The information displayed in frame 401 in this illustrative example includes a Business Label 1103.

Another frame, in this case the bottom left frame 1110, displays a list 1111 of the original document 1112 (i.e., the document identified by string 1102) and the supplemental documents 1113-1116 that modify the original document 1112 (and at least some of which contribute text to the composite view in the upper right frame 1120).

Frame 1120, which in this illustrative embodiment is in the upper-right corner of the screen) displays text of the original document, as modified by one or more of the supplemental documents 1113, 1114, 1115, and 1116. Frame 1130 displays the original document 1112. The version of the document 1112 shown in frame 1120 in this way (with or without the original text 1121), may be referred to as a "composite document."

In this example, original text (1121) of the original document 1112 was modified by a later supplemental document (e.g., one or more of documents 1113-1116), so that the modified text (1122) is different than the original text (1121). In frame 1120, text 1121 from the original document is in red, while the revised, most recent text 1122 is in black.

A circular red "A" icon 1105 in the left frame 401 denotes the Business Label 1103 (if any) associated with the original text 1121 and modified 1122 text, and circular red "A" icon 1106 in the upper right frame 1120 donates the modified text 1122.

By "clicking" on the red icon 1105 in the left frame 401, this embodiment directs the user to (e.g., hyperlinks to) the modified language 1122 in the right frame 1120. By "clicking" on the red "A" icon 1105 in the left frame 401, frame 1120 displays the modified text 1122. By "clicking" on the red icon 1106 in the right frame 1120, the original text 1121 appears in red immediately below the modified text 1122, which is in black.

FIG. 11B schematically illustrates an alternate embodiment having green audit bar 1125 in the left margin of the upper-right frame 1120. When "clicked-on," the green audit bar 1125 provides, in frame 1140, a view of the supplemental document (e.g., 1113) as filed with the S.E.C., which implements (e.g., provides instructions detailing the modification, or shows the modified text, such as in a blacklined format) the modification of the original text (1121) to produce the modified text (1122).

Guarantee/Guarantor Relationships

It is not unusual for one company in an enterprise to guarantee the debt obligations of another company within its corporate tree. Such guarantees are valuable to lenders. Knowing about such guarantees may also be important to prospective future lenders, since a guarantee made by a guarantor may negatively affect the value of subsequent or additional guarantees by that guarantor. Moreover, knowing about such guarantees may be important to a prospective investor considering investing in a debt, and may be important to a debt issuer and/or guarantor, since such obligations may negatively affect the risk and/or value of such an investment.

In addition, it is not unusual for guarantee obligations to change over time. For example, a guarantor may withdraw its guarantee of a debt obligation, or become unable to perform its obligation under such guarantee. In such a case, it may be important for a lender or investor to quickly assess the increased risk or change in value.

In the fast-paced arena of trading financial instruments, news about a company, and particularly bad news, may quickly impact the value or risk associated with a financial instrument. Investors, and potential investors, may gain a significant advantage by identifying consequences of such news and acting on it before their peers. To that end, various embodiments describe systems and methods that enable a user to quickly assimilate information about, and identify and assess, guarantee obligations among entities in an enterprise.

Figure 12:
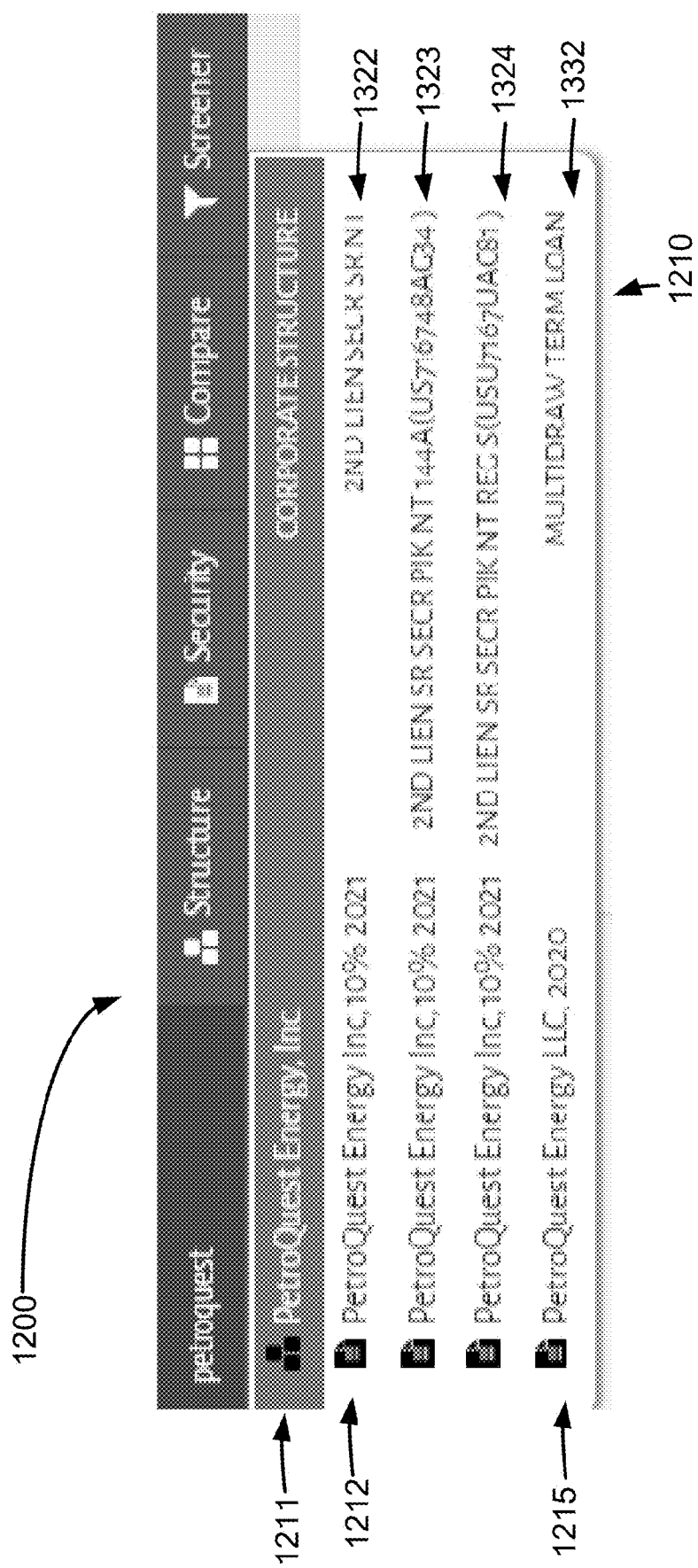
FIG. 12 schematically illustrates an embodiment of a search bar.

FIG. 12 schematically illustrates a search bar 1200 presented on a computer screen 103. The search bar 1200 includes a listing 1210 of companies within an enterprise, including PetroQuest Energy, Inc. 1211 and its subsidiary 1215. A user may, by providing a graphical input that includes graphical selection of the name of a company (e.g., clicking on the displayed company name using the mouse 104) in the search bar 1200, cause the computer 100 to display on the computer screen 103, a graphical illustration of the corporate structure of that company.

Figure 13A:
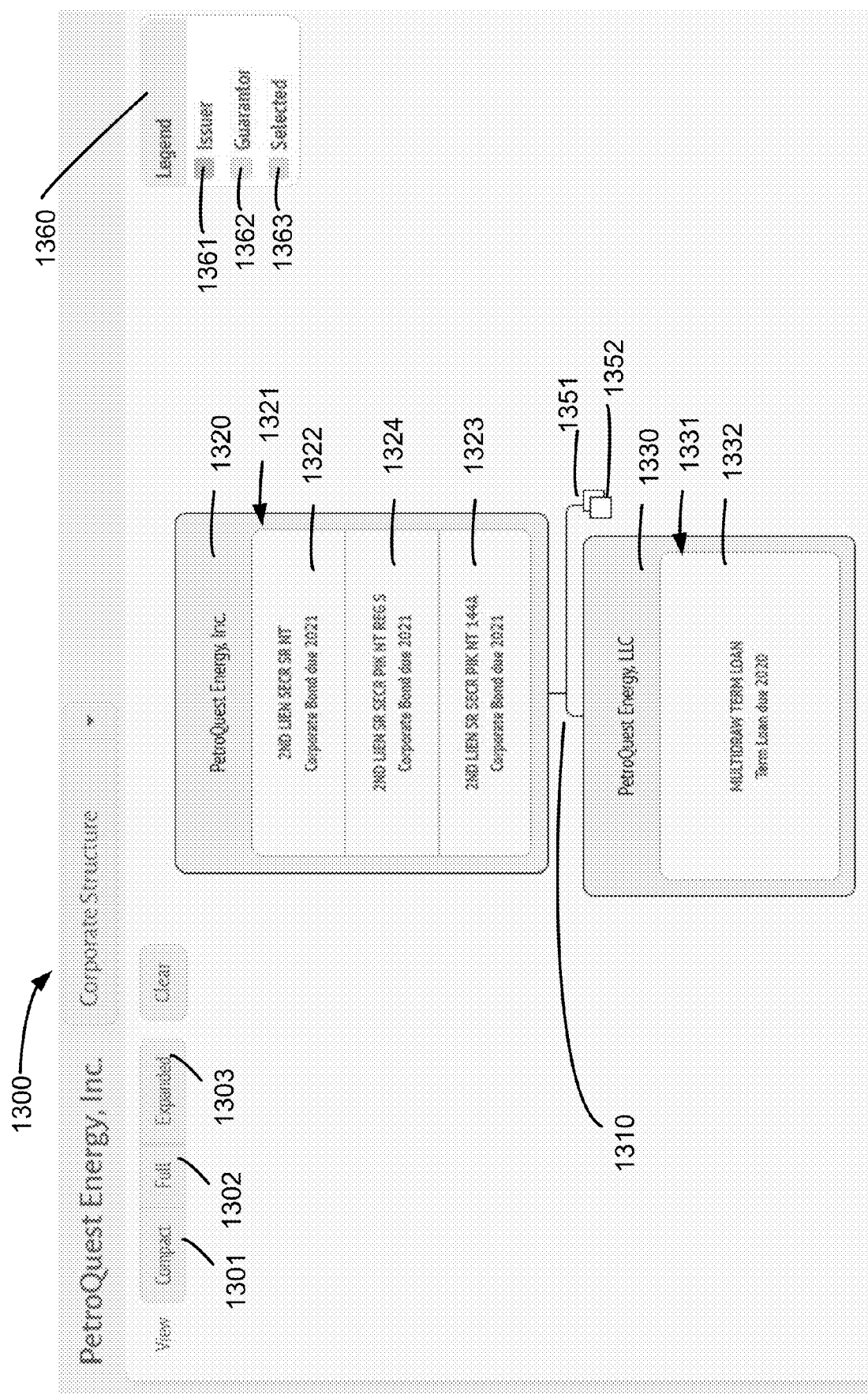
FIGS. 13A, 13B and 13C schematically illustrate embodiments of three views of a corporate structure in varying levels of detail.

As an example, clicking on the list item for PetroQuest Energy, Inc. 1211 causes a computer 161 to display on its screen 103 a hierarchical corporate structure 1300 in which the companies are interconnected by lines 1310 to indicate parent/subsidiary relationships, as illustrated in FIG. 13A. Lines that indicate relationships within a corporate structure may be straight or curved, and may be solid, dotted, or dashed. The corporate structure 1300 in FIG. 13A is displayed in "compact" format, selected by clicking on compact view selector 1301, which shows a least a portion of the corporate structure PetroQuest Energy, Inc., but may omit some related entities (e.g., subsidiaries of PetroQuest Energy, Inc.) that are not guarantors or issuers of financial instruments.

In the example of FIG. 13A, PetroQuest Energy, Inc. 1211 is shown in graphical element 1320 (e.g., which may be a box, window, or pane) along with a listing 1321 of financial instruments 1322, 1323 and 1324 issued by PetroQuest Energy, Inc. 1211.

Similarly illustrated in FIG. 13A is a graphical element 1330 for PetroQuest Energy, LLC 1215, a subsidiary of PetroQuest Energy, Inc. 1211. The graphical element 1330 includes a listing 1331 of financial instruments issued by PetroQuest Energy, LLC 1215; in this example only a single instrument 1332: "MULITIDRAW TERM LOAN: Term Loan due 2020."

Also shown in FIG. 13A are graphical elements 1351 and 1352 representing two other subsidiaries of PetroQuest Energy, Inc. 1211. Those graphical elements 1351 and 1352 are shown with a lower level of detail than the graphical element 1330 representing PetroQuest Energy, LLC.

Figure 13B:
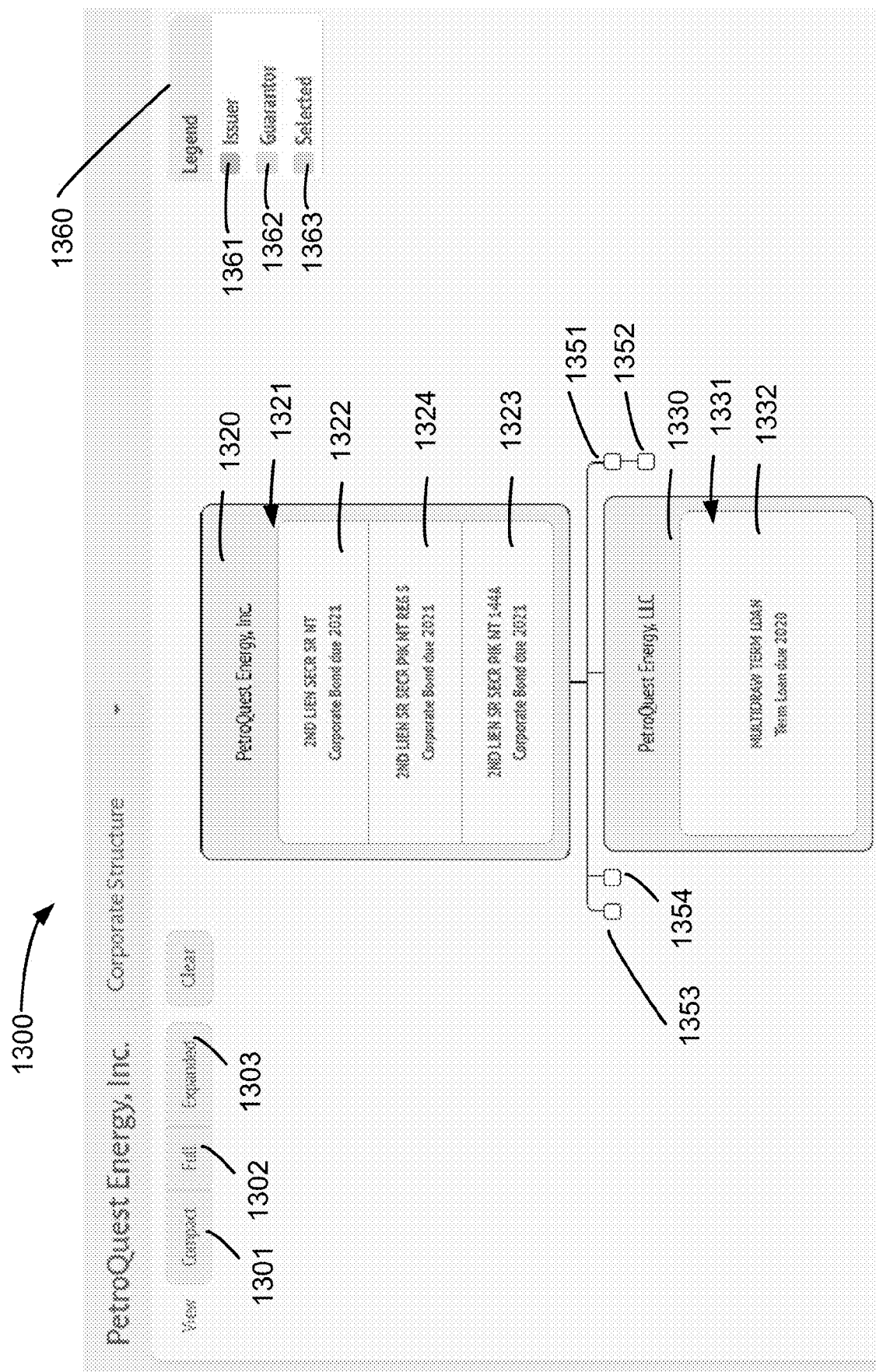

The corporate structure in FIG. 13B is also for PetroQuest Energy, Inc., 1211, but is in a "full" format, selected by clicking on full view selector 1302. Relative to FIG. 13A, the corporate structure in FIG. 13B includes graphical elements 1353 and 1354 representing two additional subsidiaries.

Figure 13C:
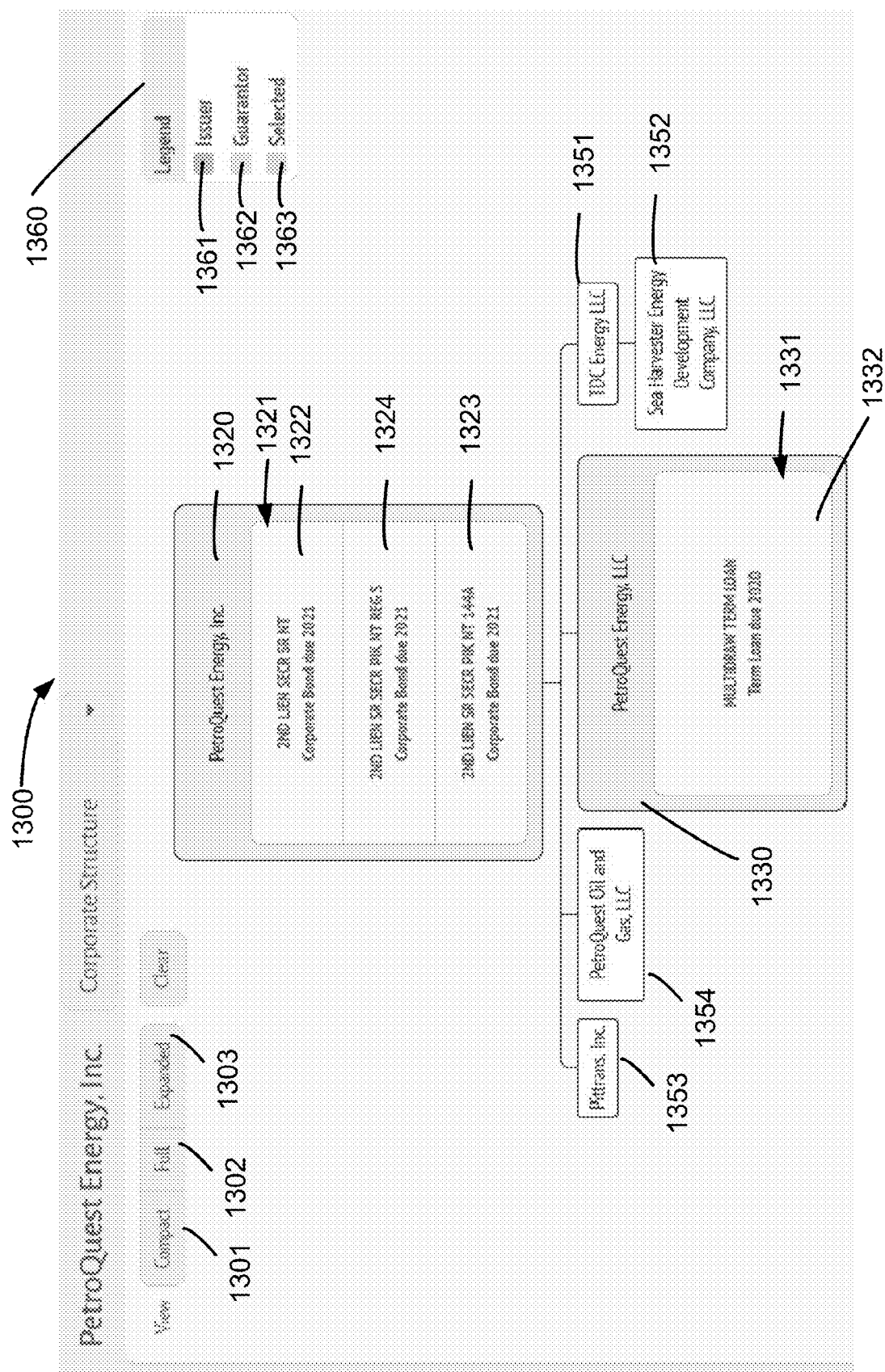

The corporate structure displayed in FIG. 13C is also for PetroQuest Energy, Inc., 1211, but is in an "expanded" format, selected by clicking on expanded view selector 1303. Relative to FIG. 13B, the corporate structure in FIG. 13C includes additional detail about the subsidiaries represented by graphical elements 1351, 1352, 1353 and 1354; in this example, the additional detail includes the names of those subsidiaries.

Guarantors—By Instrument

An interested party (e.g., an investor, potential investor, lender or potential lender, to name but a few examples) may desire to quickly and easily identify which entities, within an enterprise, guarantee a given instrument. The embodiment of FIG. 14A provides one solution.

As explained below, the embodiment of FIG. 14A graphically displays a hierarchy 1300 of companies in the enterprise, in which each company in the displayed hierarchy has a graphical representation graphically connected by a line to at least one other company in the displayed hierarchy 1300. Within the displayed hierarchy, FIG. 14A shows graphically an issuing set of companies in the enterprise that have issued financial instruments. The display visually associates, with each company's graphical representation, a representation of at least one corresponding financial instrument (1322, 1323, 1324, 1332) issued by that company. The displayed hierarchy is interactive in that a user can select a representation of a displayed financial instrument, and the embodiment will display, for that user-selected financial instrument, a set of companies, in the displayed hierarchy, that are guarantors of financial obligations associated with the user-selected financial instrument.

Figure 14A:
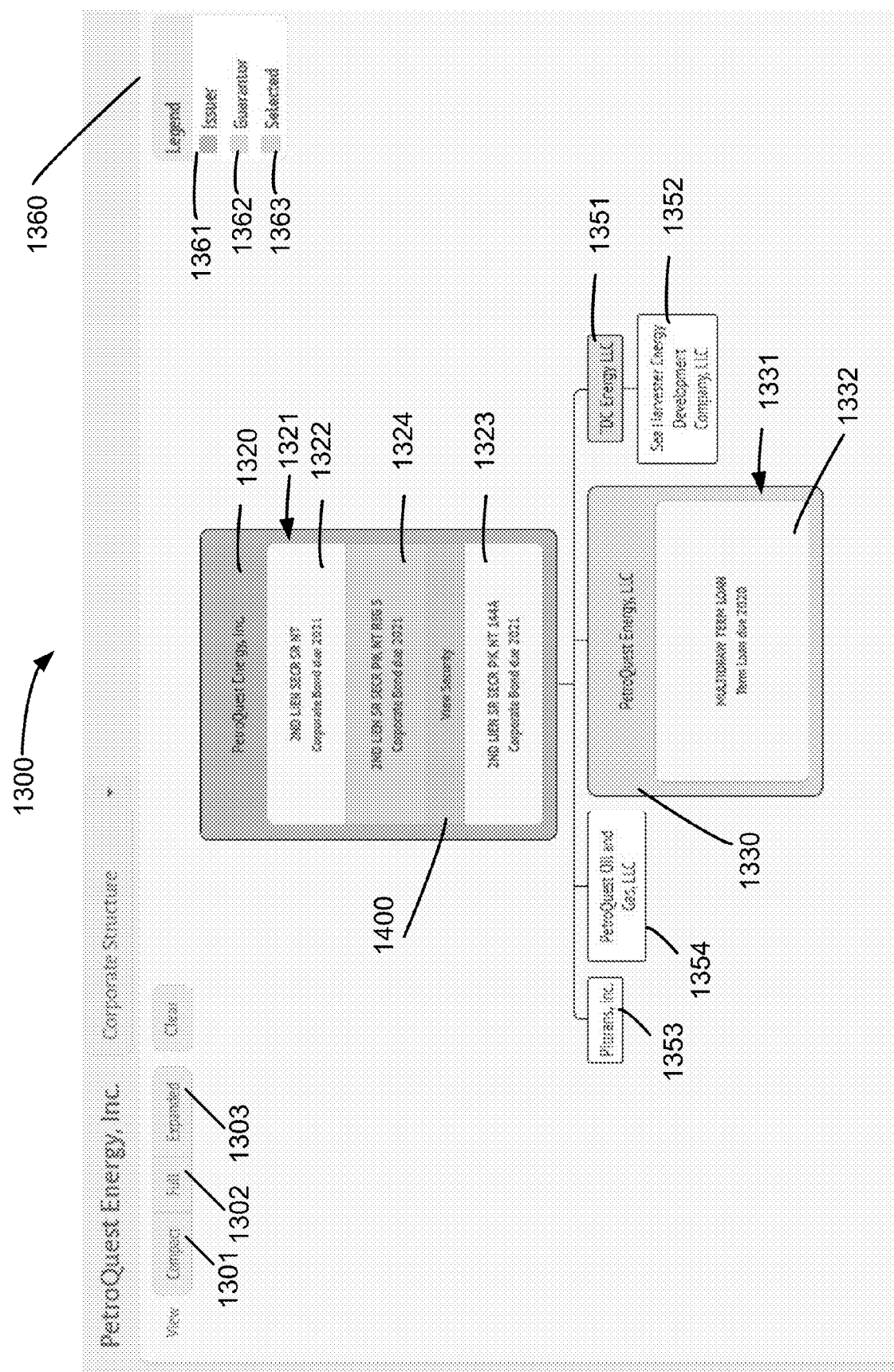
FIG. 14A schematically illustrates a display of a corporate structure showing guarantors for a given instrument.

In the example of FIG. 14A, a user has selected (e.g., clicked-on) the item 1324 representing a financial instrument "2ND LIEN SR SECR PIK NT REG S."

In response to that user selection, the graphical element 1320 representing PetroQuest Energy, Inc. 1211 turns to a color 1361 (in this example, the color is blue) to graphically indicate that PetroQuest Energy, Inc. 1211 is the issuer of that financial instrument. A key 1360 of colors indicates to the user that meaning of several colors.

Also in response, the graphical elements 1330 and 1351, representing two subsidiaries of PetroQuest Energy, Inc. 1211, turn to a color 1362 (in this example, the color is yellow) to graphically indicate that each is a guarantor of that financial instrument.

As thus displayed, the corporate structure shown in FIG. 14A enables the user to quickly and easily identify the entities, within that corporate structure, that guarantee the selected financial instrument.

Figure 14B:
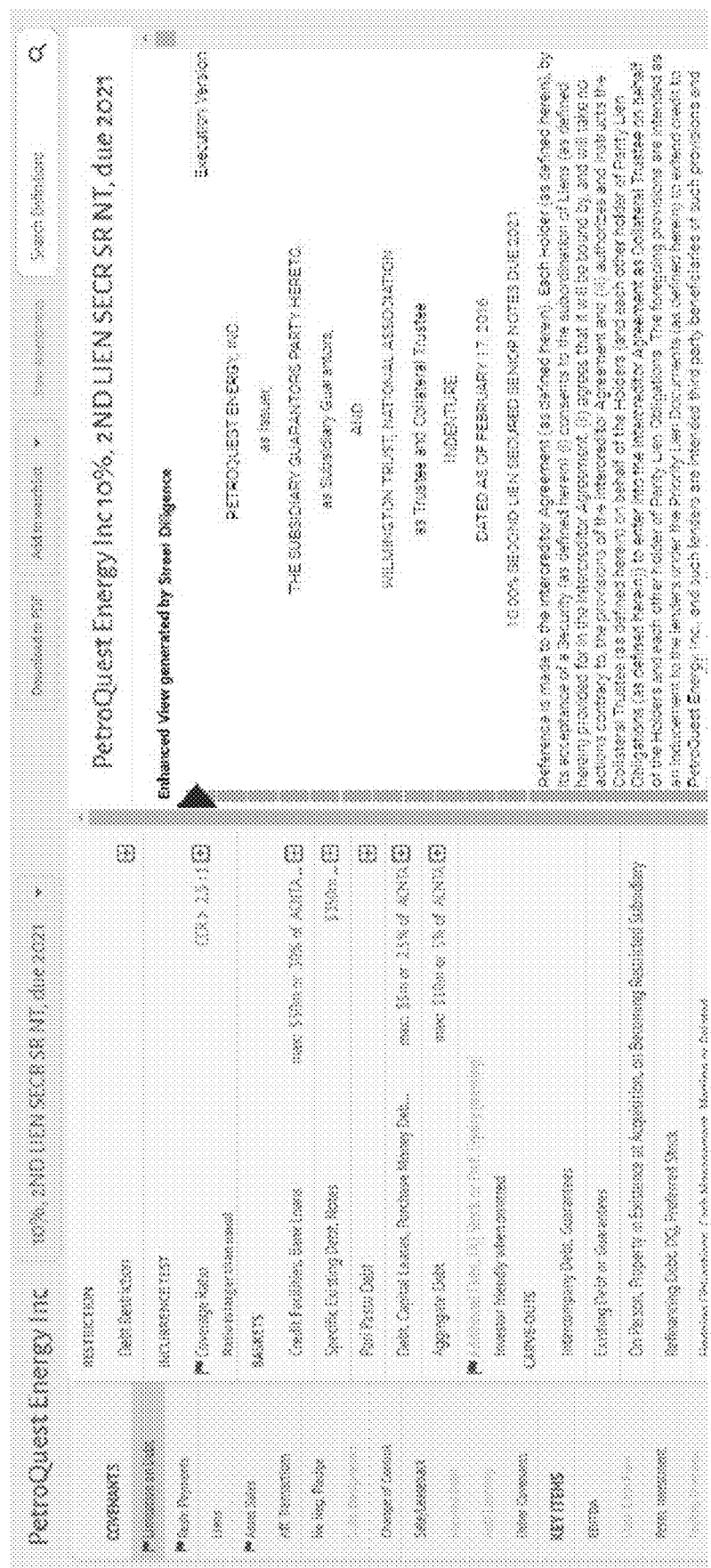
FIG. 14B schematically illustrates an embodiment of a portion of a security operably coupled to a View Security button.

Some embodiments include a "View Security" icon 1400, an embodiment of which is schematically illustrated in FIG. 14A. A user may click on the View Security icon 1400 to cause the display screen 103 to display a portion 1401 of the selected financial instrument 1324, as shown in FIG. 14B. This enables the user to quickly access and evaluate the terms of the selected financial instrument 1324.

Figure 14C:
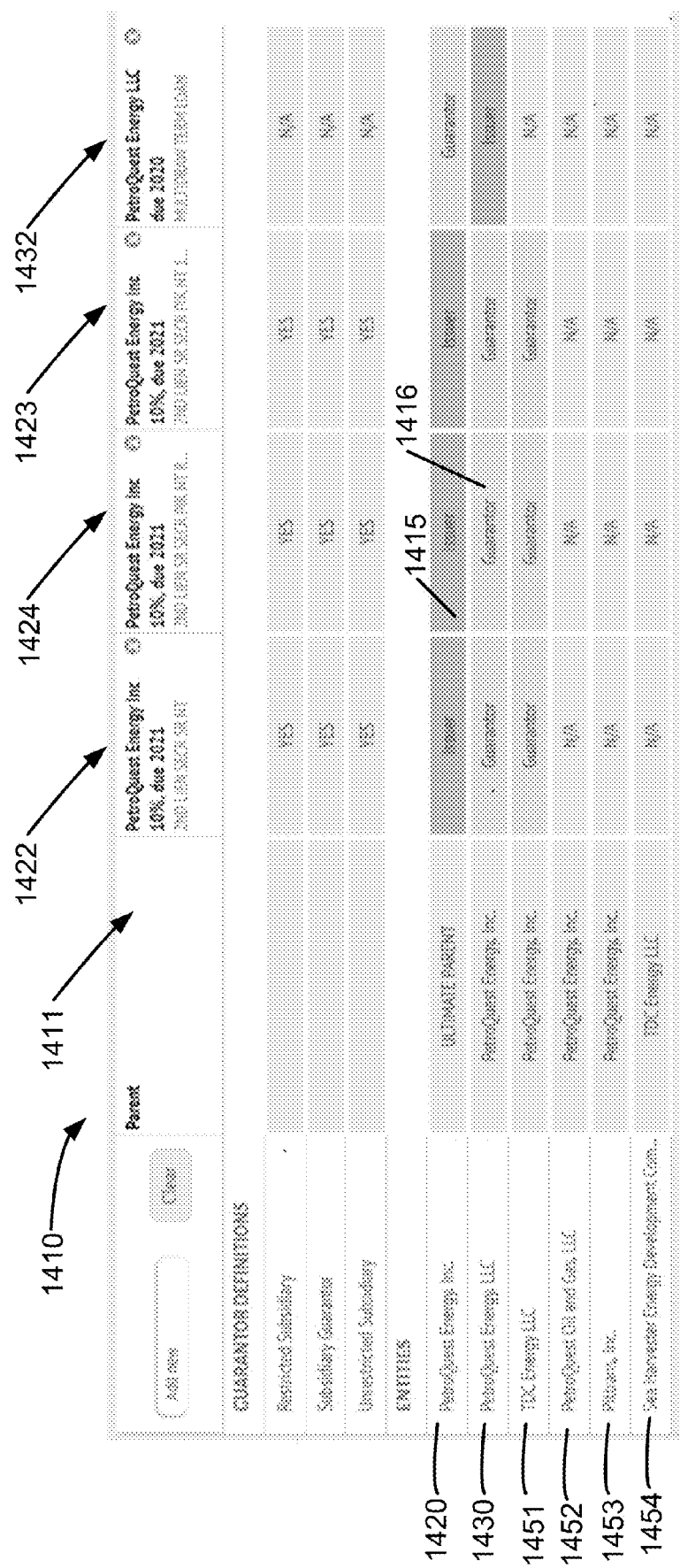
FIG. 14C schematically illustrates data in tabular form listing guarantors for certain instruments.

An alternate embodiment for exposing such relationships is schematically illustrated in FIG. 14C. In the table 1410, companies are listed in rows (1420; 1430, 1451; 1452; 1453 and 1454), and financial instruments are listed in columns (1422; 1423; 1424 and 1432).

The intersection of an entity row with a financial instrument column defines a cell, and the content of that cell indicates the relationship between an entity and a financial instrument. For example, in the embodiment of FIG. 14C, cell 1415 indicates that PetroQuest Energy, Inc. 1211 is the "Issuer" of the financial instrument "2ND LIEN SR SECR PIK NT REG S," and cell 1416 indicates that PetroQuest Energy, LLC 1215 is a "Guarantor" of that financial instrument.

Figure 14D:
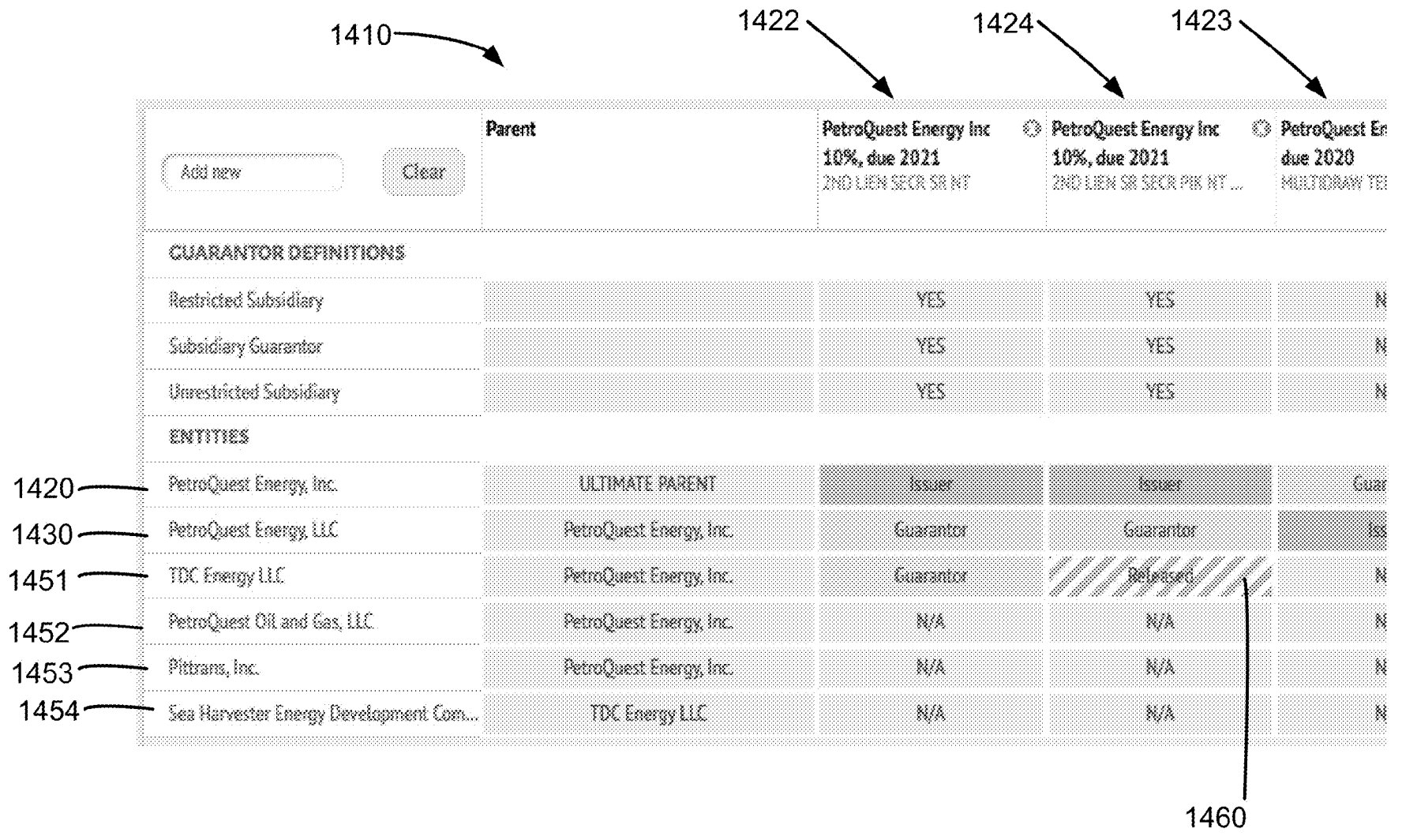

In some embodiments, the table 1410 also indicates when a guarantee relationship has changed. In the example of FIG. 14D, the cell 1460 indicates that TDC Energy LLC has been released from a previous guarantee of the "2ND LIEN SR SECR PIK NT REG S" financial instrument.

Figure 15A:
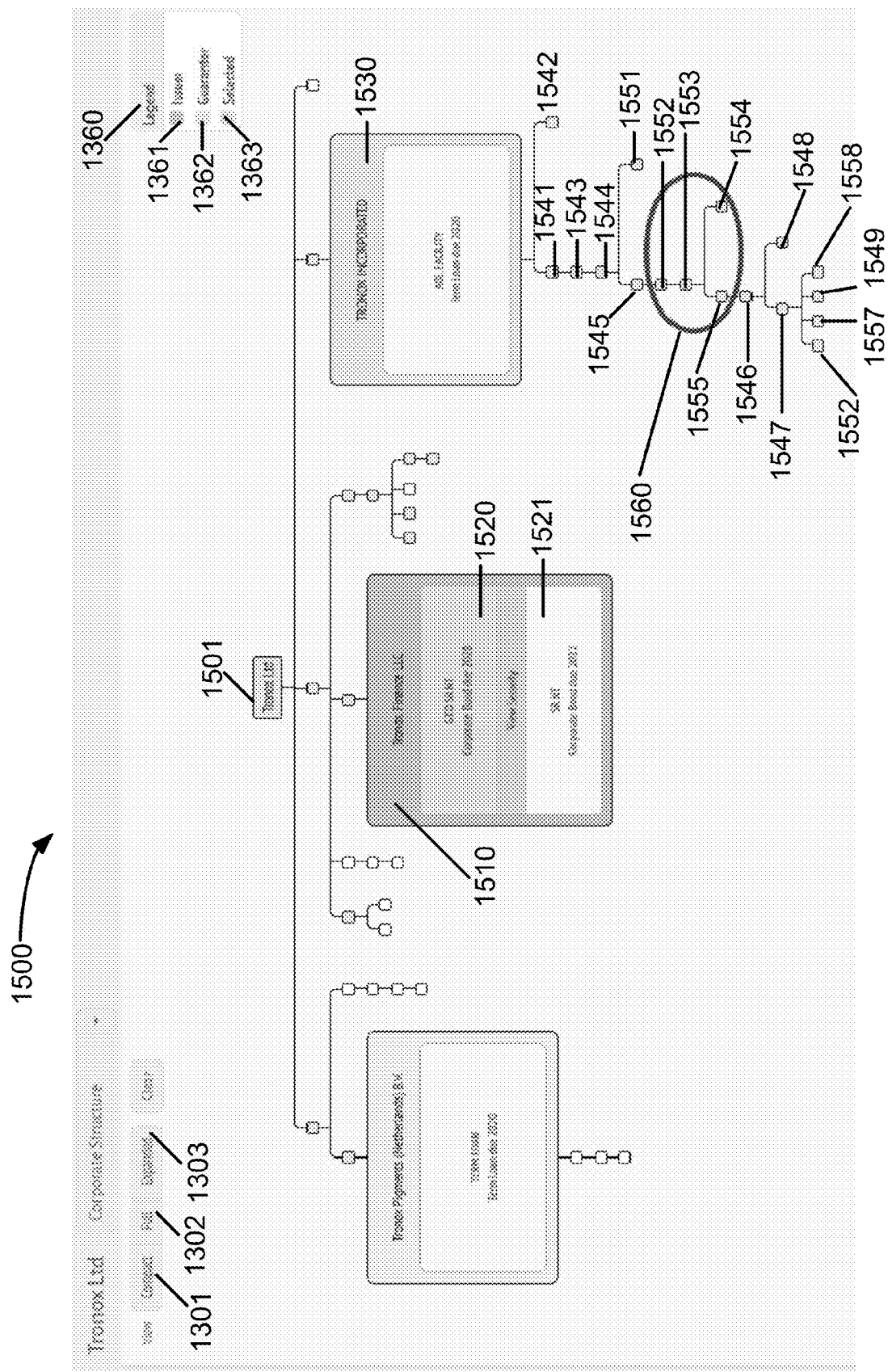
FIG. 15A schematically illustrates an embodiment of a corporate structure showing guarantors for a given instrument.
Figure 15B:
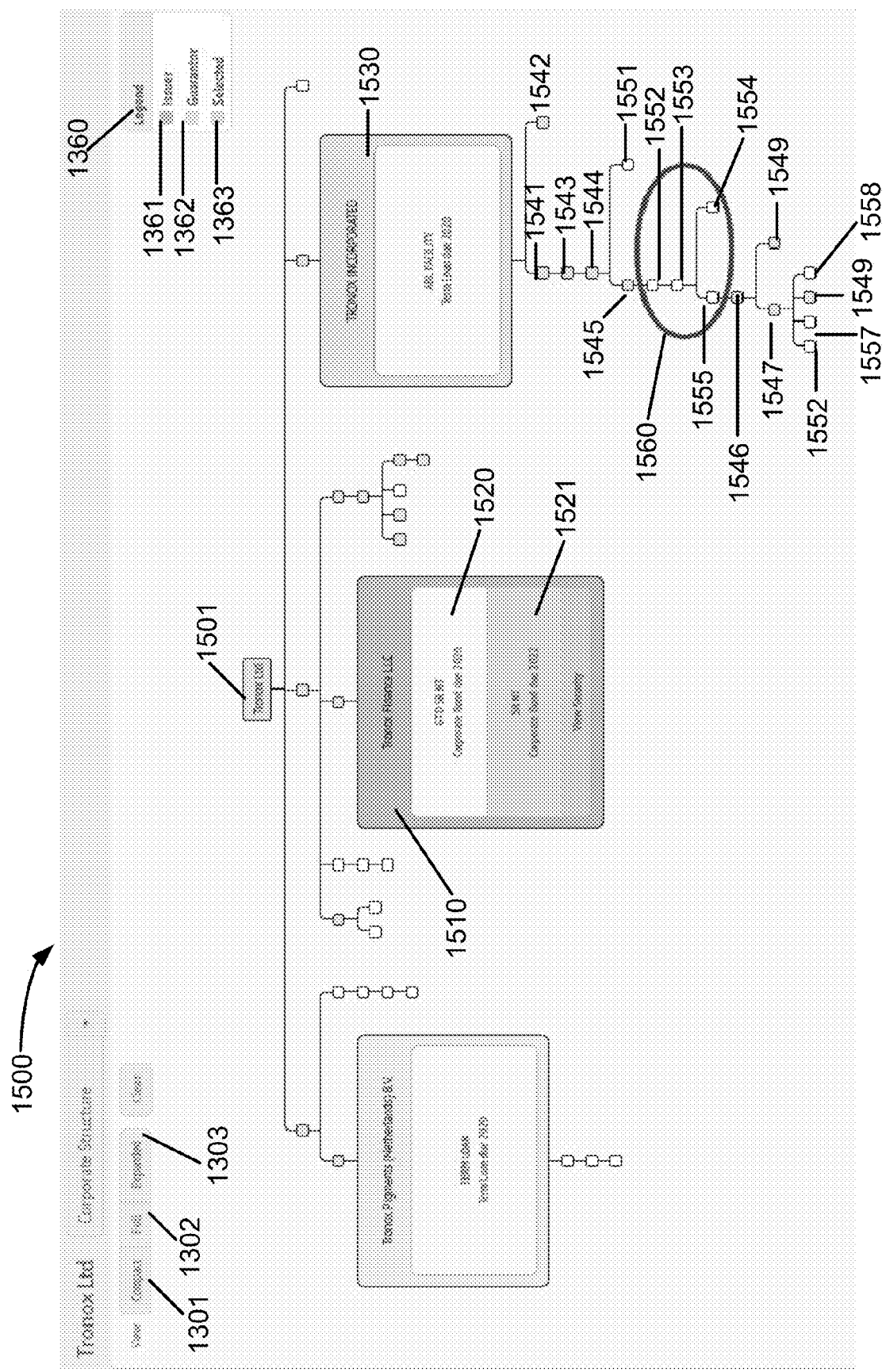
FIG. 15B schematically illustrates an embodiment of a corporate structure showing guarantors for a given instrument.

FIG. 15A and FIG. 15B schematically illustrate another embodiment of a displayed hierarchy revealing guarantor/guarantee relationships, in this example for an ultimate parent named Tronox Ltd. 1501. In these figures, the corporate tree 1500 is shown in a "full" format as described above, but could also be displayed in a "compact" format or an "expanded format."

As shown by pane 1510, Tronox Ltd. 1501 has several indirect subsidiaries, including Tronox Incorporated 1530. In turn, Tronox Incorporated has several direct and indirect subsidiaries 1541-1549 and 1551-1558.

As illustrated in FIG. 15A, a user has selected financial instrument 1520. In response, that financial instrument is shaded (color 1363) to indicate that it is the selected instrument, and many subsidiaries of Tronox Ltd. 1501, including subsidiaries 1541-1549 and 1551-1558, are shaded (color 1362) to indicate that they are guarantors of that financial instrument.

In contrast, in FIG. 15B, the user has selected financial instrument 1521 as indicated by its shading. In response, the shading of financial instrument 1520 has changed to indicate that is not selected (e.g., its shading is white). Moreover, the shading of the various subsidiaries has changed to indicate which of those subsidiaries guarantees that financial instrument 1521. In this example, subsidiaries 1541-1549 guarantee financial instruments 1521. Note that subsidiaries 1541-1549 guarantee both financial instruments 1520 and 1521.

A comparison, by the user, of FIG. 15A to FIG. 15B allows the user to quickly and easily identify not only the guarantors of the financial instruments 1520 and the guarantors of 1521, but also allows the user to quickly and easily identify entities that are not guarantors of the instruments 1520 and 1521, and to quickly and easily identify differences in the sets of companies that guarantee those financial instruments. For example, such a comparison enables the user to see that subsidiaries 1541-1549 guarantee financial instrument 1521, and that subsidiaries 1551-1558 do not.

Some embodiments allow the user to select a group of entities of particular interest within in a corporate tree, for example by enclosing them in a frame 1560. For example, in FIG. 15A and FIG. 15B, a subset including subsidiaries 1552-1555 are enclosed within a frame 1560. This structure allows the user to quickly and easily identify differences in guarantee relationships by comparing the roles of that subset of subsidiaries by comparing FIG. 15A to FIG. 15B.

Instruments—By Guarantor

An interested party (e.g., an investor, potential investor, lender or potential lender, to name but a few examples) may desire to quickly and easily identify which financial instruments are guaranteed by which entities within an enterprise. For example, an investor or potential investor in financial instruments issued by a company may benefit from knowing which of those financial instruments are guaranteed by a subsidiary of the issuing, since the value of such guarantees might be influenced by structural subordination. The embodiment of FIG. 17 provides one solution.

Figure 17:
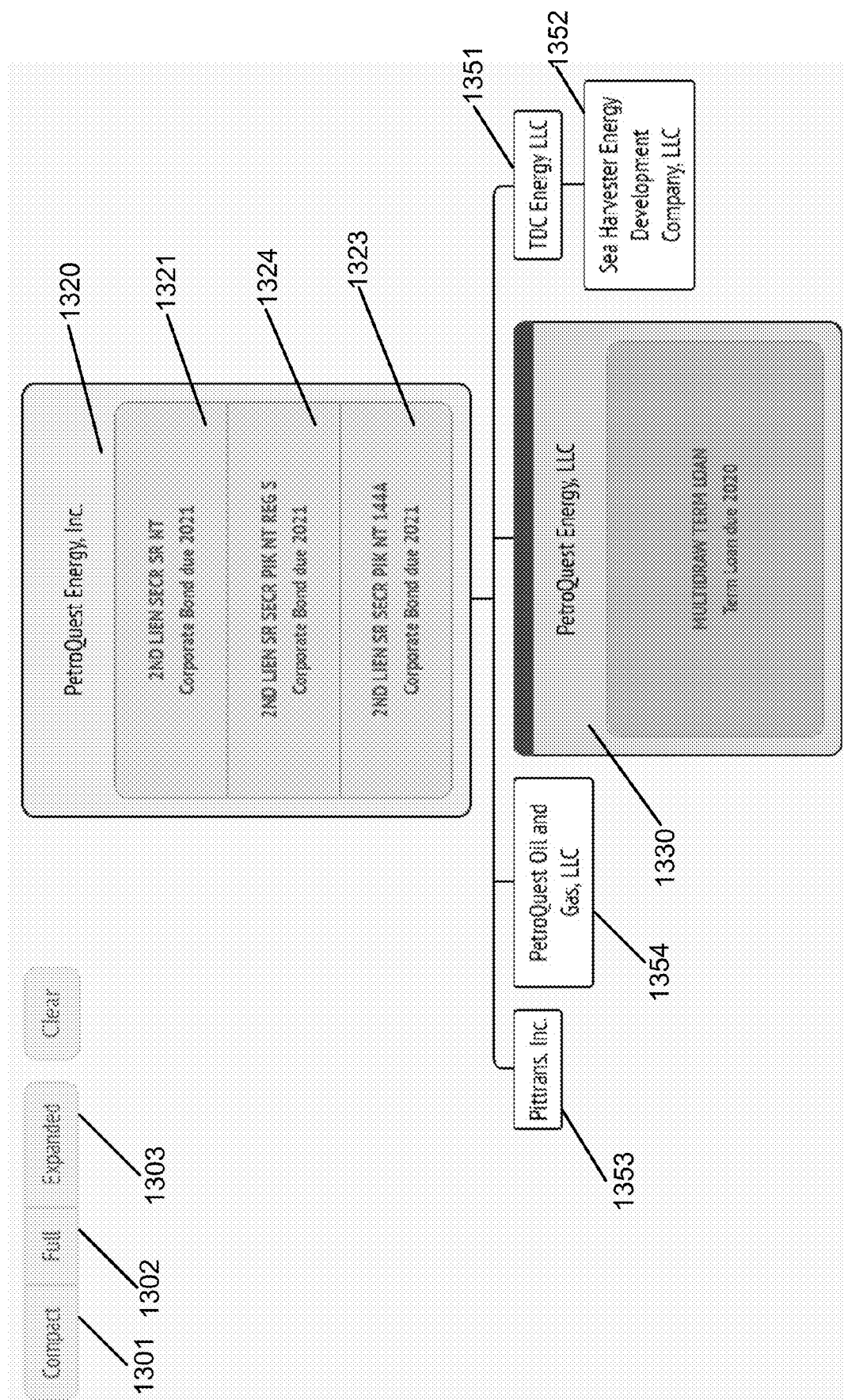
FIG. 17 schematically illustrates an embodiment of a corporate structure showing an entity selected.

The embodiment of FIG. 17 graphically displays a hierarchy of companies as described above, including an issuing set of companies in the enterprise that have issued financial instruments, and associating, with each company's graphical representation, a representation of at least one corresponding financial instrument.

The displayed hierarchy is interactive in that a user can select an entity within the displayed hierarchy, and the embodiment will display, for that user-selected entity, a set of financial instruments, the financial obligations of which are guaranteed by that entity.

In FIG. 17, a user has selected subsidiary PetroQuest Energy, LLC, as indicated by the shading 1362 of its graphical element. In response to that selection, the shading of financial instruments 1322, 1323 and 1324 has also changed shading 1362 to indicate that those financial instruments are guaranteed by PetroQuest Energy, LLC.

Figure 18A:
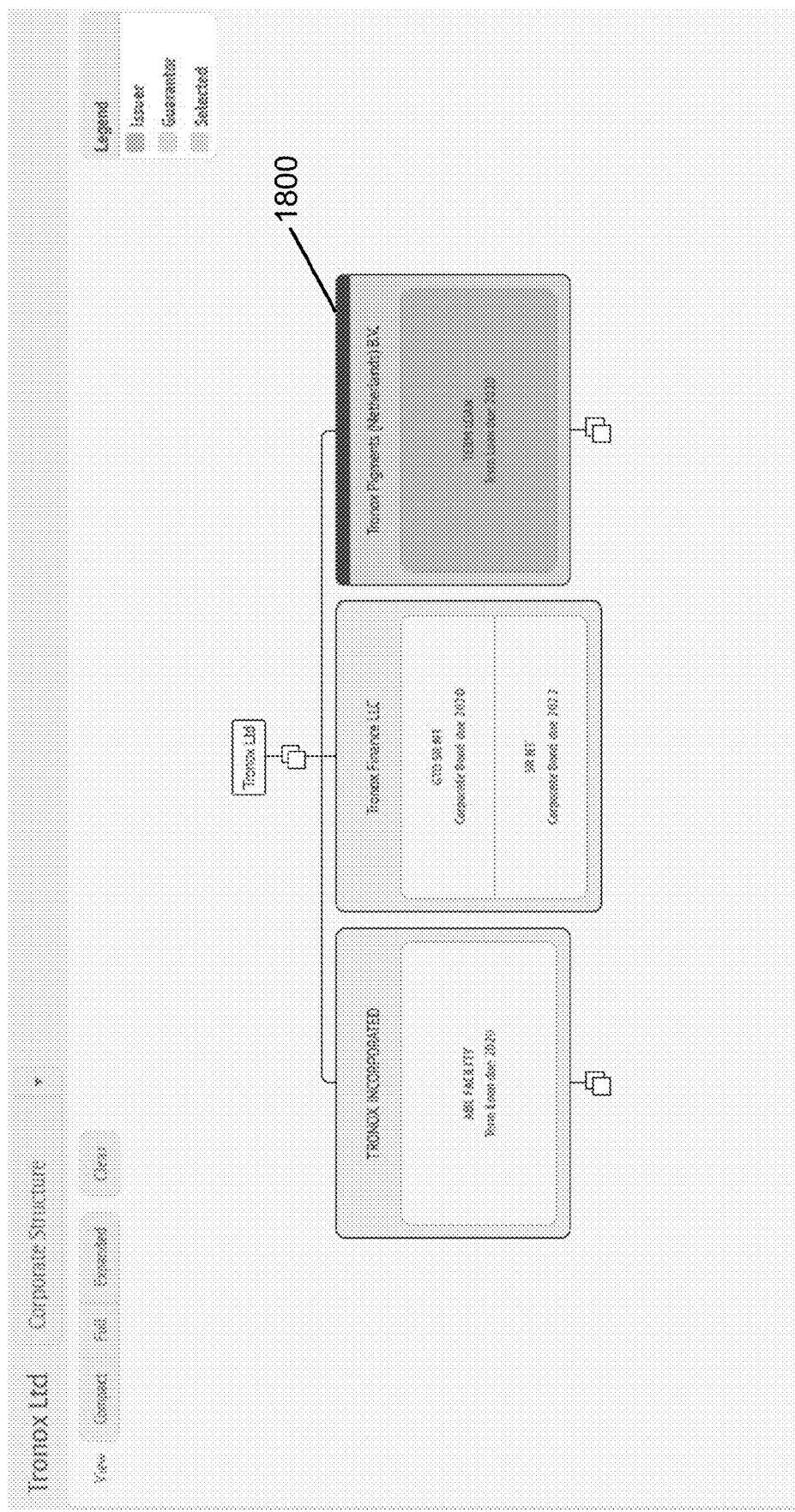
FIG. 18A schematically illustrates an embodiment of an audit bar.

If a user desires to obtain more information about a corporate structure, the user by click on an audit bar 1800 as schematically illustrated in FIG. 18A. In this embodiment, the audit bar 1800 is part of pane 1510, identifying the selected entity as Tronox Pigments (Netherlands) B.V.

Figure 18B:
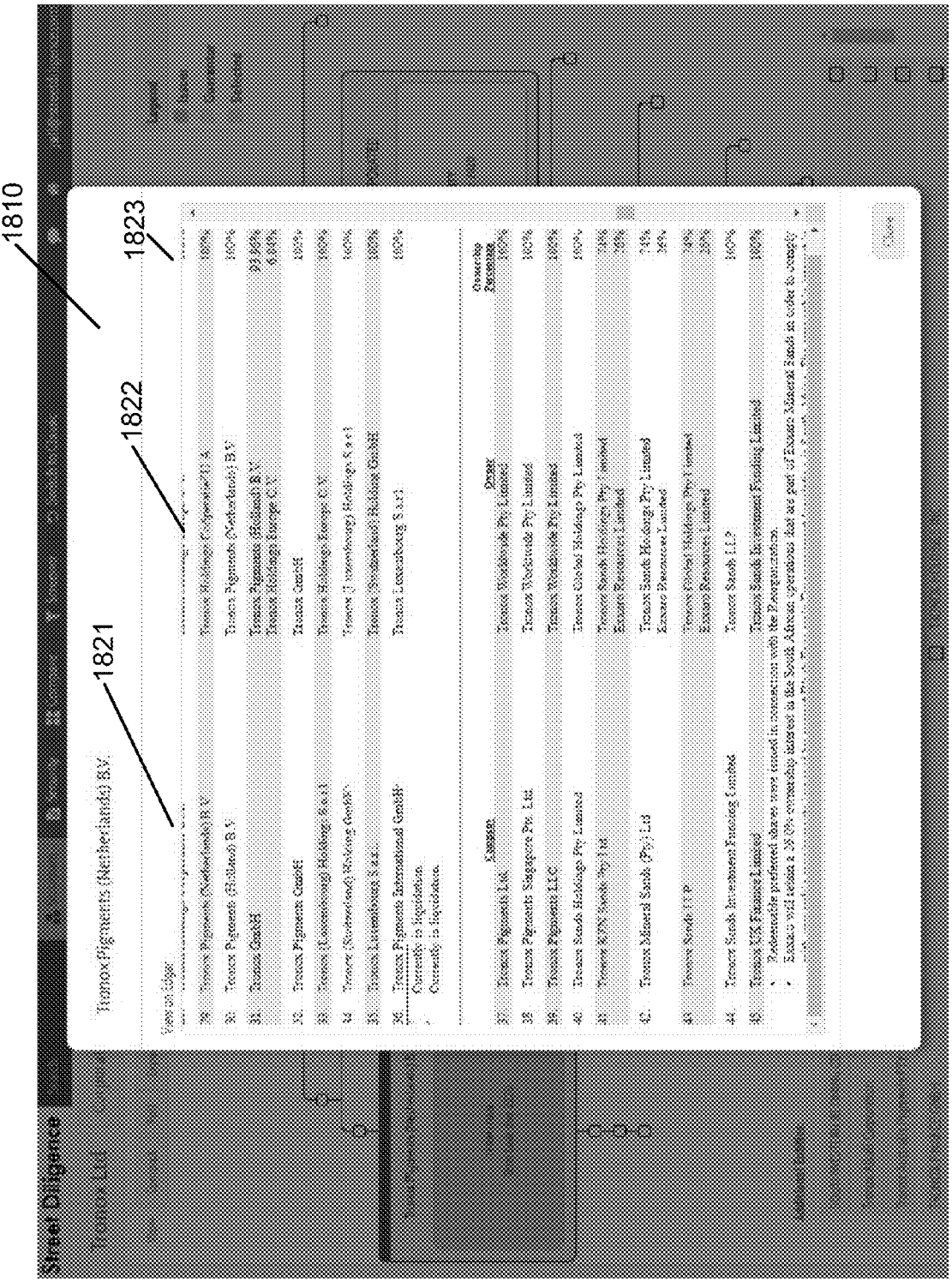
FIG. 18B schematically illustrates an embodiment of a display of corporate information operably coupled to an audit bar.

Clicking on the audit bar 1800 causes the display screen 103 to display a graphic 1810, as in FIG. 18B for example, in this case a listing, of entities within the corporate structure, that are owned by the selected entity (e.g., Tronox Pigments (Netherlands) B.V.), as well as entities that hold an ownership interest in the selected entity. The graphic 1810 identifies the entities in column 1821, the owner of each entity in column 1822, and the ownership percentage in column 1823.

Structural Subordination

Structural subordination is an issue that arises due to the corporate structure of an enterprise, and even the risk of structural subordination may erode the value of a financial instrument. Creditors and potential creditors have a need to understand that risk by knowing the companies in the enterprise and the corporate relationships among those companies, as well as the financial instruments issued by the companies and the guarantor/guarantee relationships among the members of the enterprise. Moreover, in the fast-paced trading arena, such a party needs to quickly identify, assess and act on that information.

Stated generally, structural subordination is caused by the subordination (in right of payment) of security 1 issued by company A to another security 2 issued by company B in the same enterprise (due to the ownership structure of the enterprise in spite of the fact that security 1 would be senior in right of payment to security 2 had both securities been issued by the same company. For example, if security 1 is a term loan (bank loan) issued by company A and security 2 is an unsecured bond issued by company B and company B is 100% owner of company A, then the following can be the case: in the event of a liquidation event whereby all assets in the enterprise sit at company B, then claimants to those assets at company B have priority over claimants of those same assets at company A. In this case, bond holders of security 1 in company B would be paid first before loan holders in company A. This is in spite of the fact that generally bank loan holders are senior to bond holders issued out of the same company. Since these securities were issued out of different companies (A and B) and since the assets sit at company B, then the bond holders of security 2 are senior in right of payment to loan holders in security 1. This effect is called structural subordination and a visual representation of the enterprise, the debt issued out of each company and the guarantees across the enterprise from one company to another company's debt help evaluate structural subordination effectively. This would otherwise be done manually via a drawing or equivalent, rather than via a dynamic software platform like that disclosed herein, which can highlight the issuers, debt and guarantor/guarantee relationships. In short, it is easier and quicker to evaluate the structural makeup of an enterprise with the embodiments described herein, allowing for simple understanding of issuers, debt and guarantor/guarantee relationships.

In the past, a potential for structural subordination could be identified only through painstaking assessment of corporate documents, or S.E.C. filings, to identify not only companies, but the financial instruments issued by those companies, and their subsidiaries. In the fast-moving world of trading, taking time to do that research often meant missing an opportunity.

The following examples illustrate the concepts of structural subordination in an enterprise in which ultimate parent A has two subsidiaries, B and C. In the scenarios below, subsidiary B holds all of the enterprise's assets, which amount to $5.

In a first scenario, subsidiary B issues both a bond for $10 a bank loan for $15. As known in the industry, the bank loan would be senior in right of payment to the bond. For example, in the event of a liquidation (e.g., Chapter 7 of the US Bankruptcy code), the bank loan lenders would get the $5 and the bondholders would get nothing. This is an example of typical seniority in right of payment of a bank loan to a bond.

In a second scenario, subsidiary B issues the bond for $10 and subsidiary C issues a bank loan for $15, and later the enterprise files for Chapter 7 liquidation. In that event, given that all the enterprise's assets are at subsidiary B, the creditors at subsidiary B have priority; that is the creditors at subsidiary B get paid first, out of the enterprise's assets. Thus, the senior-most claimants at subsidiary B are the bondholders, followed by the common stock holders of subsidiary B. The bondholders at subsidiary B are due $10, but there are only $5 in assets, thus the bondholders at subsidiary B get 50 cents/Dollar on their $10. The common stock holders at B get nothing, and the bank loan holders at subsidiary C get nothing. This means that subsidiary C's bank loan was structurally subordinate to subsidiary B's bond. Understandably, the bank loan lenders at subsidiary C are displeased with that outcome. Consequently, it is common for bank loan lenders in that position to obtain, from subsidiary B, a guarantee of the bank loan issued by subsidiary C.

In a third scenario, subsidiary B issues the bond for $10 and subsidiary C issues the bank loan for $15, and subsidiary B also guarantees the bank loan issued by subsidiary C because the lenders of that bank loan were worried about structural subordination, particularly since all the assets sit at subsidiary B. Due to that guarantee, when the enterprise is liquidated, the bank loan at subsidiary C is treated, in effect, as if it was issued by subsidiary B. Consequently, the $5 goes to the bank loan lenders at subsidiary C not the bondholders at B. In effect, the guarantee has eliminated, for the bank loan lenders at subsidiary C, the risk of structural subordination.

Figure 16:
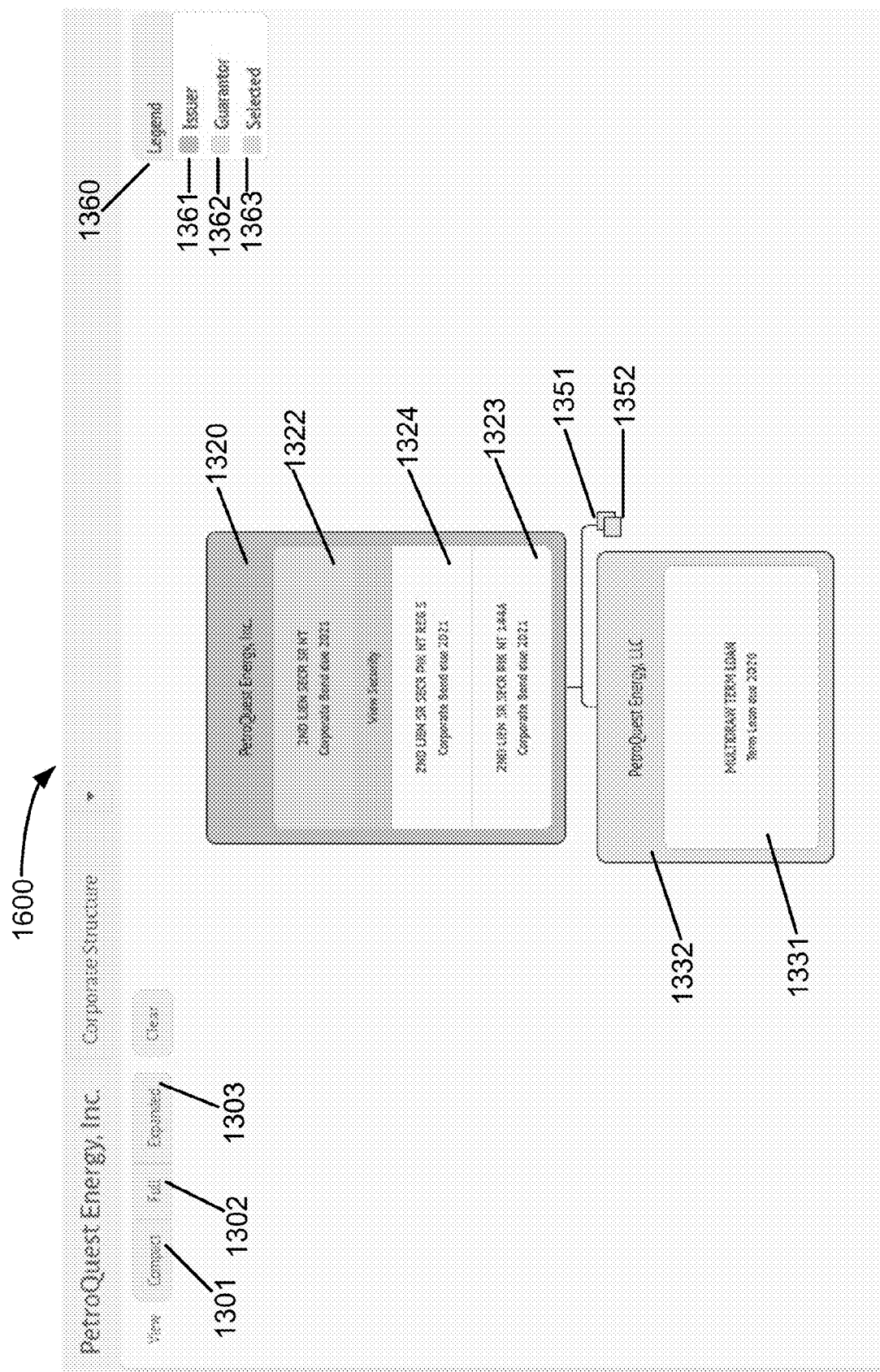
FIG. 16 schematically illustrates an embodiment of a corporate structure showing instruments and guarantee relationships.

The embodiment of FIG. 16 allows a lender, potential lender, other creditor or investor to quickly assess the risk of structural subordination. Specifically, the embodiment of FIG. 16 graphically displays, on a display screen 103, a corporate hierarchy 1600 that graphically reveals to the user information by which the user can identify and assess the risk of structural subordination: not only does the corporate hierarchy 1600 identify the companies in the enterprise, and not only the financial instruments issued by the companies and the financial instruments guaranteed by the companies, but also, at a single glance, reveals the corporate relationships among the companies.

Consider a scenario from the viewpoint of a creditor to PetroQuest Energy, Inc. under the $2^{nd}$ Lien Secr. SR NT Corporate Bond 1322. At a glance, the creditor would understand from the graphically displayed corporate hierarchy 1600 that—due to structural subordination, and in the absence of a guarantee of that financial instrument by PetroQuest Energy, LLC 1215—the creditors of PetroQuest Energy, LLC 1215 would have a priority claim to the assets of PetroQuest Energy, LLC 1215 in the event of a liquidation. Fortunately for the creditor of PetroQuest Energy, Inc. under the $2^{nd}$ Lien Secr. SR NT Corporate Bond 1322, the graphically displayed corporate hierarchy 1600 reveals that PetroQuest Energy, LLC 1215 guarantees (i.e., is a guarantor of) the obligations of PetroQuest Energy, Inc. 1212 under the $2^{nd}$ Lien Secr. SR NT Corporate Bond 1322, and therefore that the creditor will have a claim to the assets of PetroQuest Energy, LLC 1215 that is superior to a claim on those assets by the creditors of PetroQuest Energy, LLC 1215.

If there were no such guarantee, the graphically displayed corporate hierarchy 1600 would indicate that lack of guarantee, and thereby alert the creditor to the risk of structural subordination, by a lack of shading of the pane 1332 representing PetroQuest Energy, LLC 1215.

Figure 19:
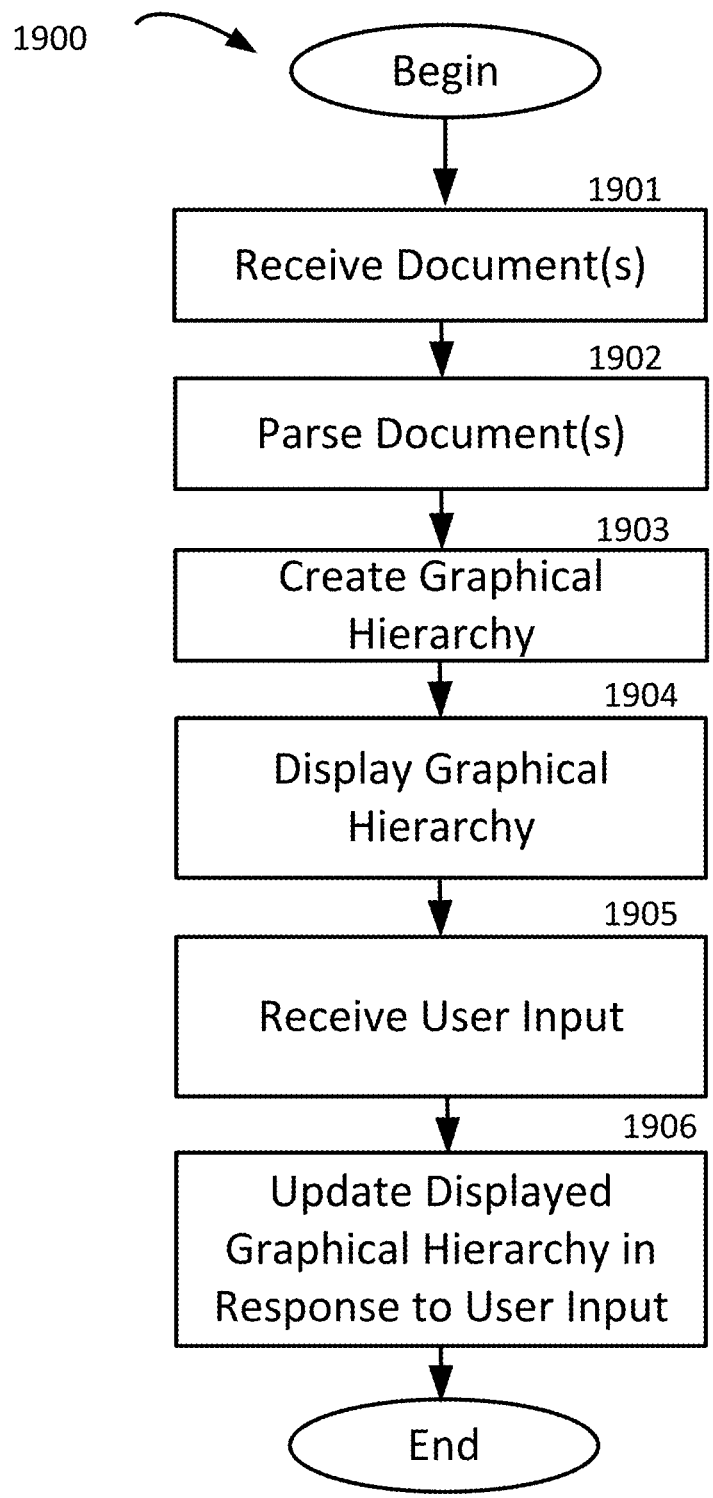
FIG. 19 schematically illustrates a flow chart for presenting a corporate hierarchy.

FIG. 19 is a flow chart of a computer process of preparing, displaying and using a corporate hierarchy.

Step 1901 includes receiving, at a server (e.g., computer 100; server 151) from a source (e.g., from a database at database server 155, or file server 181), a set of documents characterizing the hierarchy of companies in an enterprise, and information relating to financial instruments issued by companies within the enterprise, and guarantees by companies with the enterprise of those financial instruments. The set of documents may include, for example, contracts and corporate documents provided by a company within the enterprise, or documents obtained from EDGAR.

Step 1902 includes parsing documents within the set of documents to extract information for preparing a displayed hierarchy, such as the displayed hierarchies described above, and saving the extracted information in a computer memory. The extracted information may include, for example, names of companies and their parent/subsidiary relationships, information identifying which of those companies are issuers of financial instruments and the financial instruments issued by those issuers, along with information correlating, for each of the issued financial instruments, which of the companies within the enterprise guarantee financial obligations associated the financial instruments.

Using the extracted information, step 1903 generates a graphical hierarchy, such as those described above, and step 1904 displays that graphical hierarchy, on a display screen 103, to a user.

Step 1905 includes receiving input from the user to select a financial instrument, or a company. For example, step 1905 may include receiving, from the user, a graphical input, specifying a financial instrument or company, that includes graphical selection (e.g., a click from mouse 104) of the instrument or company in the display.

In response to the user input, step 1906 updates the displayed hierarchy, as illustrated in the embodiments described above. For example, in the case of a user-selected financial instrument, step 1906 changes the displayed hierarchy to highlight a set of companies, in the displayed hierarchy, that are guarantors of financial obligations associated with the user-selected financial instrument. In the case of a user-selected company, step 1906 changes the displayed hierarchy to highlight a set of financial instruments guaranteed by the user-selected company. In some embodiments, a user may select more than one financial instrument, and display, and optionally toggle back and forth between, the hierarchies produced by each such selection, to enable the user to identify differences between the sets of guarantors of the selected financial instruments.

Various embodiments may be implemented at least in part in any conventional computer programming language. For example, some embodiments may be implemented in a procedural programming language (e.g., "C"), or in an object oriented programming language (e.g., "C++"). Other embodiments may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments may be implemented as a combination of both software (e.g., a computer program product) and hardware. Still other embodiments may be implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of graphically and interactively displaying a debt capital structure of an enterprise, wherein the method utilizes computer processes comprising:
   receiving and storing, at a server, a set of electronic documents pertinent to the debt capital structure of the enterprise;
   parsing, by the server, the set of documents to extract information identifying:
      a set of financial instruments, each instrument in the set issued by a company within the enterprise;
      for each financial instrument in the set of financial instruments, the issuer thereof, and each company in the enterprise serving as guarantor of obligations created thereby; and
      parent-subsidiary relationships of companies within the enterprise; and
   analyzing the parent-subsidiary relationships and issuer-guarantor relationships to construct a corporate tree of the enterprise reflecting the foregoing relationships;
   causing, by the server, an interactive hierarchical graphical display of the corporate tree of the enterprise, in which each company in the displayed corporate tree has a graphical representation graphically connected by a line to at least one other company in the displayed corporate tree, so as to indicate a parent-subsidiary relationship, the displayed corporate tree graphically and interactively representing the complex ownership and hierarchical structuring across the enterprise;
   wherein, in the displayed corporate tree, appears (i) a graphical representation of each company in an issuing set of companies in the enterprise that has issued at least one financial instrument and (ii) a visually associated graphical representation of the at least one corresponding financial instrument, wherein the graphical representations of the financial instruments are graphically selectable; and
   wherein, responsive to receiving by the server a user's graphical selection of the graphical representation of a given financial instrument in the displayed corporate tree, causing, by the server, graphical indication, in the displayed corporate tree, of graphical representations of a set of companies that are guarantors of financial obligations associated with the given financial instrument.

2. The computer-implemented method of claim 1, further comprising:
   receiving, from a user, a graphical input, specifying the user-selected financial instrument, that includes graphical selection of the instrument in the display.

3. A computer-implemented method of graphically and interactively displaying a debt capital structure of an enterprise, wherein the method utilizes computer processes comprising:
   receiving and storing, at a server, a set of electronic documents pertinent to the debt capital structure of the enterprise;
   parsing, by the server, the set of documents to extract information identifying:
      a set of financial instruments, each instrument in the set issued by a company within the enterprise;

for each financial instrument in the set of financial instruments, the issuer thereof, and each company in the enterprise serving as guarantor of financial obligations created thereby; and parent-subsidiary relationships of companies within the enterprise;

analyzing the parent-subsidiary relationships and issuer-guarantor relationships to construct a corporate tree of the enterprise reflecting the foregoing relationships; and causing, by the server, an interactive hierarchical graphical display of the corporate tree of the enterprise, in which each company in the displayed corporate tree has a graphical representation graphically connected by a line to at least one other company in the displayed corporate tree, so as to indicate a parent-subsidiary relationship, the displayed corporate tree graphically and interactively representing the complex ownership and hierarchical structuring across the enterprise;

wherein, in the displayed corporate tree, appears (i) graphical representation of each company in an issuing set of companies in the enterprise that has issued at least one financial instrument and (ii) a visually associated graphical representation of the at least one corresponding financial instrument, wherein the graphical representation of each company is graphically selectable; and wherein, responsive to receiving by the server a user's graphical selection of the graphical representation of a given company in the displayed corporate tree, causing, by the server, graphical indication of a set of financial instruments, in the displayed corporate tree, that include financial obligations guaranteed by the given company.

4. The computer-implemented method of claim 3, further comprising:

receiving, from a user, a graphical input, specifying the user-selected company, that includes graphical selection of the company in the display.

* * * * *

UNITED STATES PATENT AND TRADEMARK OFFICE
CERTIFICATE OF CORRECTION

PATENT NO. : 10,474,702 B1
APPLICATION NO. : 15/827444
DATED : November 12, 2019
INVENTOR(S) : Hazelton et al.

Page 1 of 1

It is certified that error appears in the above-identified patent and that said Letters Patent is hereby corrected as shown below:

On the Title Page

Item (72) Inventor is corrected to read:
-- Stephen G. Hazelton, Chappaqua, NY;
Jarvis Sill, New York, NY;
Derek Petillo, Brooklyn, NY;
Duo Ai, Hoboken, NJ --.

Signed and Sealed this
Ninth Day of June, 2020

Andrei Iancu
*Director of the United States Patent and Trademark Office*